(12) United States Patent
Khoshnevisan et al.

(10) Patent No.: US 11,444,680 B2
(45) Date of Patent: Sep. 13, 2022

(54) BEAM SWITCHING IN A HIGH RADIO FREQUENCY SPECTRUM BAND

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/902,106

(22) Filed: Jun. 15, 2020

(65) Prior Publication Data

US 2021/0021330 A1    Jan. 21, 2021

Related U.S. Application Data

(60) Provisional application No. 62/875,797, filed on Jul. 18, 2019.

(51) Int. Cl.
*H04W 56/00* (2009.01)
*H04B 7/08* (2006.01)
(Continued)

(52) U.S. Cl.
CPC ........... *H04B 7/088* (2013.01); *H04B 7/0617* (2013.01); *H04L 1/0003* (2013.01);
(Continued)

(58) Field of Classification Search
CPC ..... H04B 7/088; H04B 7/0617; H04W 76/27; H04W 8/24; H04W 16/28; H04W 56/001;
(Continued)

(56) References Cited

U.S. PATENT DOCUMENTS 10,219,225 B2   2/2019  Kim et al.
2014/0016620 A1* 1/2014  Singh ............... H04L 5/0078
                                            370/336

(Continued)

FOREIGN PATENT DOCUMENTS

EP          3500036 A1    6/2019
WO   WO-2018129300 A1    7/2018

OTHER PUBLICATIONS

International Search Report and Written Opinion—PCT/US2020/037859—ISA/EPO—dated Nov. 9, 2020.

*Primary Examiner* — Sai Ming Chan
(74) *Attorney, Agent, or Firm* — Holland & Hart LLP; Kevin M. Donnelly

(57) ABSTRACT

Methods, systems, and devices for wireless communications are described. A user equipment (UE) may support signaling an indication of a duration (for example, in UE capability information) for the UE to perform a beam switch (for example, to switch between different directional beams). Among other examples, base stations may be configured with a default value related to a duration for UEs to perform a beam switch. Thus, in an absence of the above signaling by the UE, base stations may identify a duration for UEs to perform a beam switch according to the configured default value. Additionally, base stations may allocate symbols between different physical channels (such as, downlink channels or uplink channels) related to directional communications. One or more symbols may be exclusive of or be part of resources related to the physical channels to provide improvements to beam switching for UEs.

49 Claims, 23 Drawing Sheets

(51) Int. Cl.
*H04W 76/27* (2018.01)
*H04B 7/06* (2006.01)
*H04L 1/00* (2006.01)
*H04L 27/26* (2006.01)
*H04W 8/24* (2009.01)
*H04W 16/28* (2009.01)
*H04W 72/12* (2009.01)

(52) U.S. Cl.
CPC ........ *H04L 1/0068* (2013.01); *H04L 27/2607* (2013.01); *H04W 8/24* (2013.01); *H04W 16/28* (2013.01); *H04W 56/001* (2013.01); *H04W 72/1263* (2013.01); *H04W 76/27* (2018.02)

(58) Field of Classification Search
CPC .. H04W 72/1263; H04L 1/003; H04L 1/0068; H04L 27/2607
USPC ......................................................... 370/329
See application file for complete search history.

(56) References Cited

U.S. PATENT DOCUMENTS

| | | | |
|---|---|---|---|
| 2017/0251518 A1* | 8/2017 | Agiwal | H04W 76/28 |
| 2018/0026684 A1* | 1/2018 | Wei | H04L 5/0007 370/329 |
| 2018/0279227 A1* | 9/2018 | Kim | H04W 52/38 |
| 2018/0310257 A1* | 10/2018 | Papasakellariou | H04W 72/1289 |
| 2018/0331799 A1 | 11/2018 | Zhang et al. | |
| 2019/0097756 A1* | 3/2019 | Chatterjee | H04L 1/0041 |
| 2019/0159135 A1* | 5/2019 | MolavianJazi | H04W 52/362 |
| 2019/0159203 A1 | 5/2019 | Kim et al. | |
| 2019/0159230 A1* | 5/2019 | Kim | H04W 72/1268 |
| 2019/0273544 A1* | 9/2019 | Cha | H04L 5/0091 |
| 2019/0349059 A1* | 11/2019 | John Wilson | H04B 7/0695 |
| 2020/0059398 A1* | 2/2020 | Pan | H04L 5/0048 |
| 2020/0136874 A1* | 4/2020 | Baldemair | H04L 5/0051 |
| 2021/0314984 A1* | 10/2021 | Yang | H04W 72/1268 |

* cited by examiner

BEAM SWITCHING IN A HIGH RADIO FREQUENCY SPECTRUM BAND

CROSS REFERENCE

The present application for patent claims the benefit of U.S. Provisional Patent Application No. 62/875,797 by KHOSHNEVISAN et al., entitled "BEAM SWITCHING IN A HIGH RADIO FREQUENCY SPECTRUM BAND," filed Jul. 18, 2019, assigned to the assignee hereof, and expressly incorporated by reference herein.

TECHNICAL FIELD

The following relates generally to wireless communications and more specifically to beam switching in a high radio frequency spectrum band.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support beamforming operations for directional communications. Beamforming, which may also be referred to as spatial filtering, directional transmission, or directional reception, is a signal processing technique that may be used at a transmitting device or a receiving device to shape or steer an antenna beam (for example, a transmit directional beam, a receive directional beam) along a spatial path between the transmitting device and the receiving device. Some wireless communications systems may support directional communications in various radio frequency spectrum bands. In some examples, communication devices may switch between directional beams to improve communications. As demand for communication efficiency increases, it may be desirable for a wireless communications system to target low latencies and improve reliability for beam switching operations when operating in one or more radio frequency spectrum bands.

SUMMARY

The described techniques may relate to configuring a communication device, which may be a user equipment (UE), to support signaling an indication of a duration for the communication device to perform a beam switch (for example, to switch between different directional beams). In some examples, the described techniques may configure the communication device to include the indication in communication device capability information. In some examples, the described techniques may relate to configuring the signaling to be radio frequency spectrum band dependent or radio frequency spectrum band combination dependent, among other examples. For example, the communication device may signal (for example, exclusively signal) the indication of the duration for the beam switch when operating in a high radio frequency spectrum band. Among other examples, the described techniques may relate to configuring the signaling to be different for different directional beams (for example, different for downlink receive directional beams and different for uplink transmit directional beams or different for different sets of one or more directional beams). Additionally or alternatively, in some examples, the described techniques may configure other devices (for example, base stations or network access nodes) with a default value related to the duration for communication devices (for example, UEs) to perform the beam switch. Thus, in an absence of signaling by the communication device, base stations or network access nodes may identify the duration for communication devices to perform the beam switch according to the configured default value.

Additionally, the described techniques may relate to configuring base stations or network access nodes to allocate one or more symbols between different physical channels (such as, downlink channels or uplink channels) related to directional communications. In some examples, the one or more symbols may be exclusive of resources related to the physical channels, while in other examples the one or more symbols may be part of resources of the physical channels. The one or more symbols may represent a gap between different physical channels, which may improve beam switching for communication devices. The described techniques may therefore configure communication devices to support directional communications according to the allocated one or more symbols between different physical channels that may be either exclusive of resources related to the physical channels or inclusive of resources of the physical channels. The described techniques may thus include features for improvements to power consumption, reliability for beam switching, spectral efficiency, higher data rates and, in some examples, may promote low latency for beam switching operations, among other benefits.

One innovative aspect of the subject matter described in this disclosure can be implemented in a method for wireless communications at a UE. The method may include receiving, from a base station, a request for UE capability information, determining a duration for the UE to switch from one or more first directional beams to one or more second directional beams, and transmitting, based on determining the duration, the UE capability information including an indication of the duration to the base station.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a base station, a request for UE capability information, determine a duration for the apparatus to switch from one or more first directional beams to one or more second directional beams, and transmit, based on determining the duration, the UE capability information including an indication of the duration to the base station.

Another innovative aspect of the subject matter described in this disclosure can be implemented in an apparatus for wireless communications at a UE. The apparatus may include means for receiving, from a base station, a request for UE capability information, determining a duration for the apparatus to switch from one or more first directional beams to one or more second directional beams, and transmitting, based on determining the duration, the UE capability information including an indication of the duration to the base station.

Another innovative aspect of the subject matter described in this disclosure can be implemented in a non-transitory computer-readable medium storing code for wireless communications at a UE. The code may include instructions executable by a processor to receive, from a base station, a request for UE capability information, determine a duration for the UE to switch from one or more first directional beams to one or more second directional beams, and transmit, based on determining the duration, the UE capability information including an indication of the duration to the base station.

One innovative aspect of the subject matter described in this disclosure can be implemented in a method for wireless communications at a UE. The method may include receiving, from a base station, scheduling information comprising an allocation of one or more symbols corresponding to one or more physical downlink channels or one or more physical uplink channels; determining an overlap or a partial overlap of a symbol of the one or more symbols into a duration for the UE to switch from one or more first directional beams to one or more second directional beams as part of a beam switch procedure; and communicating with the base station based at least in part on the determining.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a base station, scheduling information comprising an allocation of one or more symbols corresponding to one or more physical downlink channels or one or more physical uplink channels; determine an overlap or a partial overlap of a symbol of the one or more symbols into a duration for the UE to switch from one or more first directional beams to one or more second directional beams as part of a beam switch procedure; and communicate with the base station based at least in part on the determining.

Another innovative aspect of the subject matter described in this disclosure can be implemented in an apparatus for wireless communications at a UE. The apparatus may include means for receiving, from a base station, scheduling information comprising an allocation of one or more symbols corresponding to one or more physical downlink channels or one or more physical uplink channels; means for determining an overlap or a partial overlap of a symbol of the one or more symbols into a duration for the UE to switch from one or more first directional beams to one or more second directional beams as part of a beam switch procedure; and means for communicating with the base station based at least in part on the determining.

Another innovative aspect of the subject matter described in this disclosure can be implemented in a non-transitory computer-readable medium storing code for wireless communications at a UE. The code may include instructions executable by a processor to receive, from a base station, scheduling information comprising an allocation of one or more symbols corresponding to one or more physical downlink channels or one or more physical uplink channels; determine an overlap or a partial overlap of a symbol of the one or more symbols into a duration for the UE to switch from one or more first directional beams to one or more second directional beams as part of a beam switch procedure; and communicate with the base station based at least in part on the determining.

One innovative aspect of the subject matter described in this disclosure can be implemented in a method for wireless communications at a base station. The method may include determining a duration for a UE to switch from one or more first directional beams to one or more second directional beams as part of a beam switch procedure, allocating, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmitting scheduling information including an indication of the one or more symbols to the UE.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to determine a duration for a UE to switch from one or more first directional beams to one or more second directional beams as part of a beam switch procedure, allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmit scheduling information including an indication of the one or more symbols to the UE.

Another innovative aspect of the subject matter described in this disclosure can be implemented in an apparatus for wireless communications at a base station. The apparatus may include means for determining a duration for a UE to switch from one or more first directional beams to one or more second directional beams as part of a beam switch procedure, allocating, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmitting scheduling information including an indication of the one or more symbols to the UE.

Another innovative aspect of the subject matter described in this disclosure can be implemented in a non-transitory computer-readable medium storing code for wireless communications at a base station. The code may include instructions executable by a processor to determine a duration for a UE to switch from one or more first directional beams to one or more second directional beams as part of a beam switch procedure, allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmit scheduling information including an indication of the one or more symbols to the UE.

One innovative aspect of the subject matter described in this disclosure can be implemented in a method for wireless communications at a base station. The method may include determining a duration for a UE to switch from one or more first directional beams to one or more second directional beams as part of a beam switch procedure, allocating one or more symbols associated with one or more of one or more physical downlink channels or one or more physical uplink channels associated with one or more of the one or more first directional beams or the one or more second directional beams, determining, based on one or more of the duration or the allocation of the one or more symbols, an overlap of a symbol of the one or more symbols into the duration or a partial overlap of the symbol of the one or more symbols into the duration, and communicating with the UE based on the determining.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to determine a duration for a UE to switch from one or more first directional beams to one or more second directional beams as part of a beam switch procedure, allocate one or more symbols associated with one or more of one or more physical downlink channels or one or more physical uplink channels associated with one or more of the one or more first directional beams or the one or more second directional beams, determine, based on one or more of the duration or the allocation of the one or more symbols, an overlap of a symbol of the one or more symbols into the duration or a partial overlap of the symbol of the one or more symbols into the duration, and communicate with the UE based on the determining.

Another innovative aspect of the subject matter described in this disclosure can be implemented in an apparatus for wireless communications at a base station. The apparatus may include means for determining a duration for a UE to switch from one or more first directional beams to one or more second directional beams as part of a beam switch procedure, allocating one or more symbols associated with one or more of one or more physical downlink channels or one or more physical uplink channels associated with one or more of the one or more first directional beams or the one or more second directional beams, determining, based on one or more of the duration or the allocation of the one or more symbols, an overlap of a symbol of the one or more symbols into the duration or a partial overlap of the symbol of the one or more symbols into the duration, and communicating with the UE based on the determining.

Another innovative aspect of the subject matter described in this disclosure can be implemented in a non-transitory computer-readable medium storing code for wireless communications at a base station. The code may include instructions executable by a processor to determine a duration for a UE to switch from one or more first directional beams to one or more second directional beams as part of a beam switch procedure, allocate one or more symbols associated with one or more of one or more physical downlink channels or one or more physical uplink channels associated with one or more of the one or more first directional beams or the one or more second directional beams, determine, based on one or more of the duration or the allocation of the one or more symbols, an overlap of a symbol of the one or more symbols into the duration or a partial overlap of the symbol of the one or more symbols into the duration, and communicate with the UE based on the determining.

DETAILED DESCRIPTION

Figure 1:
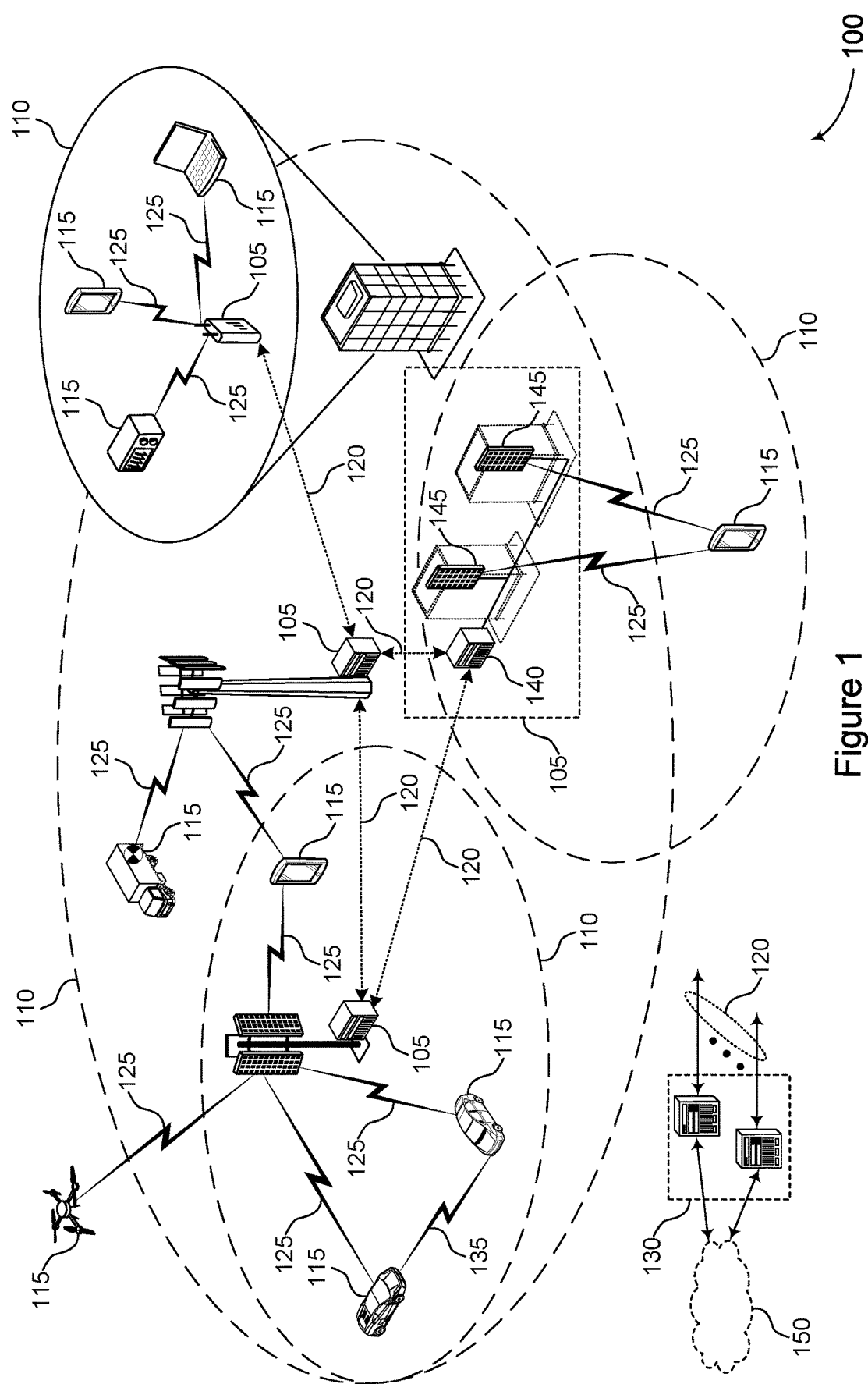
FIGS. 1 and 2 illustrate examples of wireless communications systems that supports beam switching in a high radio frequency spectrum band in accordance with aspects of the present disclosure.

The described techniques relate to methods, systems, devices, and apparatuses that support techniques related to beam switching. Generally, the described techniques support improvements to beam switching in high radio frequency spectrum bands. A high radio frequency spectrum band may be referred to as a radio frequency spectrum band that is greater than or equal to a given frequency (f) (for example, greater than 52.6 GHz). By way of example, a radio frequency spectrum band including frequencies between 52.6

GHz and 114.25 GHz (52.6 GHz<f<114.25 GHz) may be referred to as a fourth frequency range (FR4), while a radio frequency spectrum band including frequencies between 114.25 GHz and 275 GHz (114.25 GHz<f<275 GHz) may be referred to as a fifth frequency range (FR5). Therefore, FR4 and FR5, which may be above other radio frequency spectrum bands, may serve as examples of and may be referred to as high radio frequency spectrum bands.

In some examples, the described techniques may relate to configuring a communication device, such as a user equipment (UE), to support signaling an indication of a duration for the communication device to perform a beam switch (for example, to switch between different directional beams). In some examples, the described techniques may configure the communication device to include the indication in communication device capability information. In some examples, the described techniques may configure the signaling to be radio frequency spectrum band dependent, radio frequency spectrum band combination dependent, among other examples. For example, the communication device may signal the indication of the duration for the beam switch when operating in a high radio frequency spectrum band (for example, operating over one or more frequencies in FR4 or FR5). Additionally or alternatively, in some examples, the described techniques may configure base stations with a default value related to a duration for one or more communication devices to perform a beam switch. Thus, absent explicit signaling by the communication device, the base stations may identify the duration for communication devices to perform the beam switch according to the configured default value.

Additionally, the described techniques may relate to configuring the base stations to allocate one or more symbols between different physical channels (such as downlink channels or uplink channels) related to directional communications. In some examples, the one or more symbols may be exclusive of resources related to the physical channels, while in other examples the one or more symbols may be part of resources of the physical channels. In some examples, base stations may configure communication devices to mitigate or manage beamforming operations (such as beam switching) based on the allocated one or more symbols between different physical channels related to one or more directional beams.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to beam switch procedures. In some examples, communication device capability signaling including an indication of the duration related to a beam switch may support improvements to power consumption, reliability for beam switching, spectral efficiency, higher data rates and, in some examples, low latency for beam switching operations, among other benefits.

Aspects of the disclosure are initially described in the context of wireless communications systems. Aspects of the disclosure are further described in the context of resources that overlap with a beam switching time and process flows that relate to beam switching in a high radio frequency spectrum band. Aspects of the disclosure are further illustrated by and described with reference to apparatus diagrams, system diagrams, and flowcharts that relate to beam switching in a high radio frequency spectrum band.

FIG. 1 illustrates an example of a wireless communications system 100 that supports beam switching in a high radio frequency spectrum band in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated with reference to FIG. 1. The UEs 115 may be able to communicate with various types of devices, such as other UEs 115, base stations 105, or network equipment (for example, core network nodes, relay devices, integrated access and backhaul (IAB) nodes, or other network equipment), as shown with reference to FIG. 1.

Base stations 105 may communicate with the core network 130, or with one another, or both. For example, base stations 105 may interface with the core network 130 through backhaul links 120 (for example, via an S1, N2, N3, or other interface). Base stations 105 may communicate with one another over backhaul links 120 (for example, via an X2, Xn, or other interface) either directly (for example, directly between base stations 105), or indirectly (for example, via core network 130), or both. In some examples, backhaul links 120 may be or include one or more wireless links. One or more of base stations 105 may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, meters, among other examples.

The UEs 115 may be able to communicate with various types of devices, such as other UEs 115 that may sometimes act as relays as well as base stations 105 and network equipment including macro eNBs or gNBs, small cell eNBs or gNBs, or relay base stations, among other examples, as shown with reference to FIG. 1. UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode in which initial acquisition and connection may be conducted by UEs 115 via the carrier, or the carrier may be operated in a non-standalone mode in which a connection is anchored using a different carrier (for example, of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, base stations 105, UEs 115, or both) may have hardware configurations that support communications over a particular carrier bandwidth or may be configurable to support communications over one of a set of carrier bandwidths. In some examples, the wireless communications system 100 may include base stations 105 and UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs. Time intervals for base stations 105 or UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency spectrum band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of UEs 115. For example, the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, exterior spaces between or overlapping with geographic coverage areas 110, among other examples.

A macro cell generally covers a relatively large geographic area (for example, several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (for example, licensed, unlicensed) frequency spectrum bands as macro cells. Small cells may provide unrestricted access to UEs 115 with service subscriptions with the network provider or may provide restricted access to UEs 115 having an association with the small cell (for example, UEs 115 in a closed subscriber group (CSG), UEs 115 associated with users in a home or office, among other examples). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, an Intranet, an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more radio frequency spectrum bands, typically in the range of 300 megahertz (MHz) to 300 gigahertz (GHz). Generally, the region from 300 MHz to 3 GHz is known as the ultra-high frequency (UHF) region or decimeter band, as the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or a receiving device, such as a UE 115) a beam direction for subsequent transmission and reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some examples, transmissions by a device (for example, by a base station 105 or UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other examples, the device may provide HARQ feedback in a subsequent slot, or according to some other time interval.

One or more of base stations 105 or UEs 115 may support directional communications in the wireless communications system 100. Directional communications may include one or more downlink receive directional beams corresponding to one or more physical downlink channels or one or more uplink transmit directional beams corresponding to one or more physical uplink channels. The one or more physical downlink channels may include one or more of a physical downlink control channel (PDCCH), a physical downlink shared channel (PDSCH) or a synchronization signal physical broadcast channel (SS/PBCH) block, and the one or more physical uplink channels may include one or more of a physical uplink control channel (PUCCH) or a physical uplink shared channel (PUSCH). In some examples, the one or more of the base stations 105 or the UEs 115 may perform a beam sweep procedure to determine and select one or more downlink receive directional beams and one or more uplink transmit directional beams to establish a connection.

In some examples, the one or more of the base stations 105 or the UEs 115 may support directional communications in one or more radio frequency spectrum bands. In some examples, a radio frequency spectrum band may be defined by a range of radio frequencies (f) within the radio frequency spectrum band. For example, a first frequency range (FR1) may have a frequency range between 410 MHz and 7.125 GHz (410 MHz<f<7.125 GHz), a second frequency range (FR2) may have a different frequency range from FR1, for example, between 24.25 GHz and 52.6 GHz (24.25 GHz<f<52.6 GHz), while a third frequency range (FR3) may have a different frequency range from FR1 and FR2, for example, between 7.125 GHz and 24.25 GHz (7.125 GHz<f<24.25 GHz). In some examples, one or more of FR1, FR2, or FR3 may be referred to as a low radio frequency spectrum band. As such, in some examples, the one or more of the base stations 105 or the UEs 115 may support directional communications in low radio frequency spectrum bands.

Additionally or alternatively, the one or more of the base stations 105 or the UEs 115 may support directional communications in one or more high radio frequency spectrum bands. A high radio frequency spectrum band may refer to a radio frequency spectrum band that is greater than or equal to a frequency (f) (for example, greater than 52.6 GHz). In some examples, a radio frequency spectrum band including frequencies between 52.6 GHz and 114.25 GHz (52.6 GHz<f<114.25 GHz) may be referred to as a fourth frequency range (FR4), while a radio frequency spectrum band including frequencies between 114.25 GHz and 275 GHz (114.25 GHz<f<275 GHz) may be referred to as a fifth frequency range (FR5). Therefore, FR4 and FR5 may be referred to as high radio frequency spectrum bands.

Each radio frequency spectrum band, such as FR1, FR2, FR3, FR4 and FR5 may relate to a transmission numerology. Table 1 below defines examples of different transmission numerologies. In some examples, the one or more of the base stations 105 or the UEs 115 may support one or more transmission numerologies as defined in Table 1. Each numerology in Table 1 may be labeled as a parameter $\mu$. In some examples, the numerology may be based on exponentially scalable subcarrier spacing $\Delta f = 2^\mu \times 15$ kHz with $\mu = \{0, 1, 2, 3, 4\}$. As defined in Table 1, a numerology ($\mu=0$) represents a subcarrier spacing of 15 kHz. Among other examples, as defined in Table 1, numerology ($\mu=1$) represents a subcarrier spacing of 30 kHz, numerology ($\mu=2$) represents a subcarrier spacing of 60 kHz, numerology ($\mu=3$) represents a subcarrier spacing of 120 kHz, and numerology ($\mu=4$) represents a subcarrier spacing of 240 kHz.

TABLE 1

Transmission Numerologies

| $\mu$ | $\Delta f = 2^\mu \cdot 15$ [kHz] | Cyclic Prefix | Supported for Data | Supported for Synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

By way of example, radio frequency spectrum band FR1 may relate to transmission numerologies $\mu=\{0,1,2\}$. For example, radio frequency spectrum band FR1 may support subcarrier spacings of 15 kHz, 30 kHz, and 60 kHz, which may correspond to a symbol duration of approximately 71 microseconds ($\mu$s), 36 $\mu$s, and 18 $\mu$s, respectively. The symbol duration (for example, approximately 71 $\mu$s, 36 $\mu$s, and 18 $\mu$s) may include a duration of a cyclic prefix of the symbol. The base stations 105 or the UE 115 may prepend a cyclic prefix to each symbol to improve transmission of the symbol. A cyclic prefix may represent a guard period at a beginning of each symbol that may improve transmission reliability of the symbol by providing protection against one or more factors in the wireless communications system 100, such as multipath delay spread. Among other examples, radio frequency spectrum band FR2 may relate to transmission numerologies $\mu=\{2,3,4\}$. For example, radio frequency spectrum band FR2 may support subcarrier spacings of 60 kHz, 120 kHz, and 240 kHz, which may correspond to symbol durations of approximately 18 $\mu$s, 9 $\mu$s, and 4.5 $\mu$s, respectively. Similarly, the symbol duration (for example, approximately 18 μs, 9 μs, and 4.5 μs) may include a duration of a cyclic prefix for the symbol. In some examples, for radio frequency spectrum band FR2, the base stations 105 or the UEs 115 may support a 240 kHz subcarrier spacing exclusively for synchronization signal blocks (SSBs).

In some examples, a duration of a cyclic prefix may depend on the transmission numerology as defined in Table 1. That is, a duration of a cyclic prefix may be shorter or greater in length based on the transmission numerology. For example, a cyclic prefix may have a duration of 4.7 μs for a 15 kHz subcarrier spacing (for example, numerology μ=0), and 0.57 μs for a 120 kHz subcarrier spacing (for example, numerology μ=3). In some examples, as defined in Table 1, a normal cyclic prefix may be supported for each subcarrier spacing (for example, for each transmission numerology), while an extended cyclic prefix may be supported exclusively for numerology μ=2. A normal cyclic prefix may be shorter in length compared to an extended cyclic prefix. For example, a normal cyclic prefix may have a duration of 4.7 μs, while an extended cyclic prefix may have a duration of 16.7 μs.

As demand for communication efficiency increases, the wireless communications system 100 may support larger subcarrier spacings for one or more high radio frequency spectrum bands (for example, FR4 and FR5). Some examples of the wireless communications system 100 may support one or more of subcarrier spacings of 480 kHz, 960 kHz, 1.92 MHz, or 3.84 MHz for one or more high radio frequency spectrum bands (for example, FR4 and FR5). However, the wireless communications system 100 is not limited to the above examples of subcarrier spacings (for example, 480 kHz, 960 kHz, 1.92 MHz, or 3.84 MHz), as other subcarrier spacings may be supported in the wireless communications system 100.

Table 2 below illustrates an inverse correlation to one or more of a duration of a symbol or a duration of a cyclic prefix. In some examples, a subcarrier spacing may have an inverse correlation to one or more of a duration of a symbol or a duration of a cyclic prefix. For example, as the subcarrier spacing increases, one or more of the duration of the symbol or the duration of the cyclic prefix may decrease. Alternatively, as the subcarrier spacing decreases, one or more of the duration of the symbol or the duration of the cyclic prefix may increase.

TABLE 2

Correleation between subcarrier spacing, symbol duration, and cyclic prefix duration

| Subcarrier Spacing (MHz) | Subcarrier Spacing (kHz) | Symbol Length (ns) | Normal Cyclic Prefix | Extended Cyclic Prefix |
|---|---|---|---|---|
| 0.96 | $15 \times 2^6$ | 1042 | 74.4 | |
| 1.92 | $15 \times 2^7$ | 521 | 37.2 | |
| 3.84 | $15 \times 2^8$ | 260.5 | 18.6 | 65.1 |

As part of directional communications, the one or more of the base stations 105 or the UEs 115 may support beam management for one or more downlink receive directional beams corresponding to one or more physical downlink channels or one or more uplink transmit directional beams corresponding to one or more physical uplink channels. In some examples, beam management may include performing a beam switch from one or more downlink receive directional beams to one or more alternative downlink receive directional beams, or from one or more uplink transmit directional beams to one or more alternative uplink transmit directional beams to improve communications between the one or more of the base stations 105 or the UEs 115 or between the different UEs 115. In some examples, the alternative directional beams may have one or more of a higher reference signal received power (RSRP), a smaller SNR, or a smaller signal to interference and noise ratio (SINR), as compared to existing directional beams used by one or more of the base stations 105 or the UEs 115.

A beam switch procedure for the one or more of the base stations 105 or the UEs 115 may include some duration to perform a beam switch. In some examples, a duration for beam switching may be absorbed in a cyclic prefix. Among other examples, a duration for beam switching may be absorbed in a cyclic prefix for some subcarrier spacings and cyclic prefix durations, such as in FR1, FR2, and FR3. In these examples, the base stations 105 and the UEs 115 may avoid assigning a temporal gap (for example, a one-symbol gap duration) for beam switching. The temporal gap may be referred to as a beam switching delay, or simply a duration. The temporal gap may be a gap for switching one or more directional beams in cases in which a new directional beam is already determined (for example, predetermined) at the one or more of the base stations 105 or the UEs 115 and in which receive or transmit chains are configured to receive or transmit with the new directional beam. In some such cases, a timing for receiving or transmitting with the new directional beam may not be included in or part of the beam switching delay.

In some examples of the wireless communications system 100, the UEs 115 may receive with different receive directional beams (for example, different quasi-co location (QCL) types, such as QCL-type-D) without a gap (for example, without a beam switching delay) between the different receive directional beams (for example, due to the gap being smaller than a cyclic prefix duration). In some examples, the UEs 115 may be capable of receiving with different receive directional beams without any gap (for example, without a beam switching delay) between the different receive directional beams when two or more downlink physical channels (for example, two or more PDSCHs) are scheduled dynamically by the base station 105 (for example, by a PDCCH), or scheduled via semi-persistent scheduling. In some other examples, the UEs 115 may be capable of receiving with different receive directional beams when two or more downlink physical channels (for example, two or more PDSCHs) are scheduled dynamically by the base stations 105 (for example, by a same downlink control information), or correspond to a same semi-persistent scheduling configuration (for example, in cases in which PDSCH repetition with different directional beams and different transmission configuration indicator states occurs).

In some examples, the UEs 115 may be capable of receiving with different receive directional beams without any gap (for example, without a beam switching delay) between the different receive directional beams when two or more uplink physical channels (for example, two or more PUSCHs) are scheduled dynamically by the base stations 105 (for example, by a PDCCH), or scheduled via an uplink configured grant. In some other examples, the UEs 115 may be capable of receiving with different receive directional beams when two or more uplink physical channels (for example, two or more PUSCHs) are scheduled dynamically by the base stations 105 (for example, by a same downlink control information), or correspond to a same uplink configured grant configuration (for example, in cases in which PUSCH repetition with different directional beams and different scheduling request indicators occurs).

In some examples, the UEs 115 may be capable of receiving with different receive directional beams without any gap (for example, without a beam switching delay) between the different receive directional beams for a first physical channel (for example, PDSCH) and a second physical channel (for example, PDCCH) in cases in which the second physical channel schedules a third physical channel (for example packet data channel (PDCH)) and not the first physical channel. For example, if the first physical channel is PDSCH and the second physical channel is PDCCH, the PDCCH may be scheduled after the PDSCH or before the PDSCH (for example, after or before the first physical channel). In other examples, the UEs 115 may be capable of receiving with different receive directional beams without any gap (for example, without a beam switching delay) between the different receive directional beams when two or more physical channels (for example, two or more PDCCH transmissions) are received in different control resource sets with different transmission configuration indicator states, and have different QCL-type-D properties. Among other examples, the UEs 115 may be capable of receiving with different receive directional beams without any gap (for example, without a beam switching delay) between the different receive directional beams, for example, in cases in which two PUCCH transmissions have different spatial relationship information, or in cases in which one directional beam corresponds to one PUCCH and another directional beam corresponds to PUSCH, or when one directional beam corresponds to an SSB and another directional beam corresponds to a PDCCH (or a PDSCH).

As demand for communication efficiency increases, the absence of information to the one or more of the base stations 105 or the UEs 115 related to a beam switching delay may have adverse effects on the wireless communications system 100 (for example, reduced communication reliability or increased latency, among other examples). By way of example, if a cyclic prefix duration is 18.6 nanoseconds (ns), a duration for a beam switch (for example, a beam switching gap) may exceed the cyclic prefix duration. As a result, the one or more of the base stations 105 or the UEs 115 may be unable to absorb the duration of the beam switch in the cyclic prefix. It may therefore be desirable for the wireless communications system 100 to target low latencies and improve reliability for beam switching operations when the one or more of the base stations 105 or the UEs 115 operate in one or more high radio frequency spectrum bands. Examples of techniques for improving reliability for beam switching operations when the one or more of the base stations 105 or the UEs 115 operate in one or more high radio frequency spectrum bands are described with reference to FIGS. 3-8.

Figure 2:
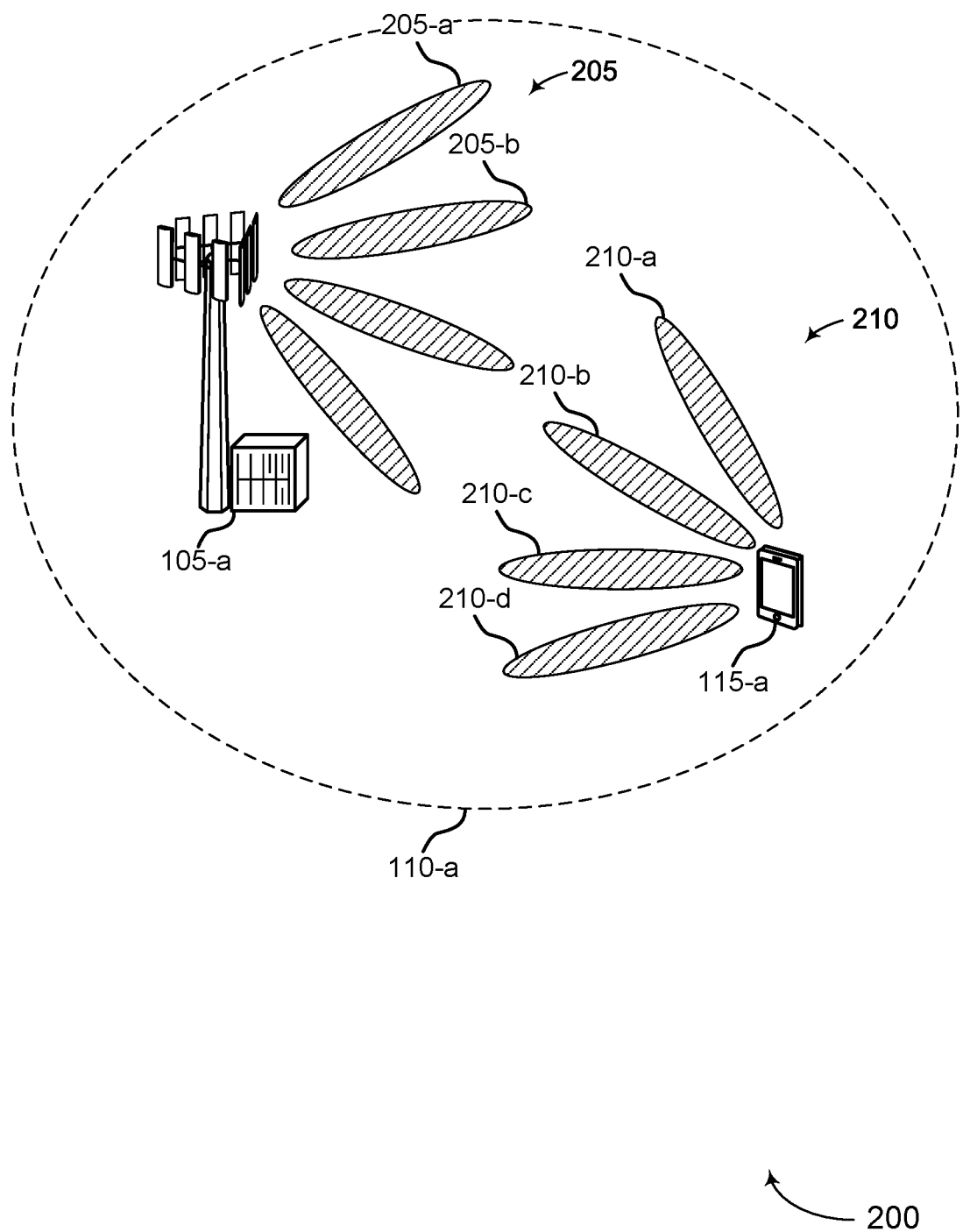

FIG. 2 illustrates an example of a wireless communications system 200 that supports beam switching in a high radio frequency spectrum band in accordance with aspects of the present disclosure. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may include a base station 105-a and a UE 115-a within a geographic coverage area 110-a. The base station 105-a and the UE 115-a may be examples of the corresponding devices described with reference to FIG. 1. The base station 105-a and the UE 115-a may support beamforming communications, and more specifically, beam switching in one or more high radio frequency spectrum bands. Beamforming communications may include one or more of the base station 105-a transmitting or receiving one or more directional beams 205 (for example, directional beams 205-a and 205-b) or the UE 115-a transmitting or receiving one or more directional beams 210 (for example, directional beams 210-a, 210-b, 210-c, and 210-d). In examples in which one of the one or more directional beams 205 and the one or more directional beams 210 include one or more uplink directional beams and the other of the one or more directional beams 205 and the one or more directional beams 210 includes downlink directional beams, the one or more directional beams 205 may have a beam correspondence with the one or more directional beams 210. For example, some or each directional beam 205 of the one or more directional beams 205 may be paired with a corresponding directional beam 210 of the one or more directional beams 210. A directional beam 205 and a directional beam 210 paired together may be referred to as a beam pair.

In some examples, the base station 105-a may transmit a message inquiring about UE capability information to the UE 115-a. For example, the base station 105-a may transmit a radio resource control message (for example, a radio resource control configuration message), which may include a request for the UE 115-a to provide UE capability information to the base station 105-a. In some examples, the UE 115-a may include, in the UE capability information, an indication of a duration (for example, a beam switch delay) for the UE 115-a to switch between two or more uplink directional beams 210. For example, the UE 115-a may determine a duration for the UE 115-a to switch from a first directional beam 210-a to a second directional beam 210-b, and may transmit, based on the inquiry, UE capability information including an indication of the duration to the base station 105-a. In some examples, the directional beams 210 may correspond to one or more of one or more downlink receive directional beams corresponding to one or more physical downlink channels or two or more uplink transmit directional beams corresponding to one or more physical uplink channels. The one or more physical downlink channels may include one or more of a PDCCH, a PDSCH or a SS/PBCH block, and the one or more physical uplink channels may include one or more of a PUCCH or a PUSCH.

Among other examples, UE capability information may be radio frequency band dependent and may be different for receive directional beams (for example, downlink receive directional beams) or transmit directional beams (for example, uplink transmit directional beams). In some examples, when the UE 115-a is capable of simultaneous beam reception or transmission, a duration for performing beam switching related to a beam pair (for example, from [a directional beam 205-a, a directional beam 210-a] to [a directional beam 205-b, a directional beam 210-b]) may be different compared to performing a beam switch related to a beam switch between non-beam pair directional beams. In other words, a duration for beam switch related to a beam pair may be longer compared to a beam switch between non-beam pairs.

In some examples, in the absence of signaling a duration of a beam switch for the UE 115-a in UE capability information, the base station 105-a may be configured with a default value (for example, a default temporal value). In some examples, the default value may be fixed, and may have a one-symbol duration or a two-symbol duration. In some examples, the default value may be 50 ns. In some examples, the default value may be different for different examples. For example, the base station 105-*a* may be configured with a first default value for when two physical channels (for example, two PDCCHs) are received in different control resource sets with different transmission configuration indicator states, and have different QCL-type-D properties. Similarly, the base station 105-*a* may be configured with a second default value for when two or more uplink physical channels (for example, two or more PUSCH transmissions) are scheduled dynamically by the base station 105-*a* (for example, by a same downlink control information), or correspond to a same uplink configured grant configuration (for example, a PUSCH repetition with different directional beams and different scheduling request indicators).

In some examples, the base station 105-*a* may allocate one or more symbols (for example, a temporal gap) between one or more of two or more different downlink physical channels or two or more different uplink physical channels when the channels are to be received or transmitted, respectively, with different directional beams. In some examples, the duration for the UE 115-*a* to switch between the directional beams 210 excludes time resources of one or more physical channels associated with one or more of the directional beams 210. In other words, time related to beam switching may not use part of the resources of a channel (for example, when scheduling, activating, or configuring the channel).

In some examples, the base station 105-*a* may determine a duration for the UE 115-*a* to switch between two or more directional beams 210, and may allocate, based on the duration, one or more symbols between one or more of two or more physical downlink channels or two or more physical uplink channels associated with the one or more directional beams 210. The one or more symbols may represent a gap (for example, a beam switching delay) between physical channels of the two or more physical downlink channels or the two or more physical uplink channels. In some examples, the base station 105-*a* may determine to allocate one or more symbols between one or more of two or more physical downlink channels, or two or more physical uplink channels associated with the one or more directional beams 210 according to one or more aspects.

By way of example, the base station 105-*a* may determine to allocate one or more symbols between two or more physical downlink channels, two or more physical uplink channels, or both associated with the one or more directional beams 210 based on a cyclic prefix duration associated with the one or more symbols. Additionally, or alternatively, the base station 105-*a* may determine to allocate the one or more symbols based on a subcarrier spacing associated with the one or more symbols. Additionally or alternatively, the base station 105-*a* may determine to allocate the one or more symbols based on a symbol duration associated with the one or more symbols.

The base station 105-*a* may, in some examples, allocate the one or more symbols between two or more different downlink physical channels, two or more different uplink physical channels, or both in cases in which the channels are to be received or transmitted, respectively, with different directional beams when scheduling, for example, one or more of PDSCH, PUSCH, or PUCCH (for example, for HARQ). In some examples, the base station 105-*a* may allocate the one or more symbols based on scheduling a PDSCH or a PUSCH repetition via downlink control information. For example, the base station 105-*a* may schedule a repetition of one or more physical downlink channels or of one or more physical uplink channels associated with one or more directional beams 210. As such, the base station 105-*a* may allocate the one or more symbols based on the scheduled repetition. In some examples, the base station 105-*a* may transmit downlink control information including an indication of the scheduled repetition. In some examples, the indication may be a time domain resource allocation field in the downlink control information. For example, the time domain resource allocation field in the downlink control information may indicate a noncontiguous allocation in the time domain between a first PDSCH or a first PUSCH and a second PDSCH or a second PUSCH.

In some examples, the base station 105-*a* may allocate the one or more symbols between two or more different downlink physical channels, two or more different uplink physical channels, or both when the channels are to be received or transmitted with different directional beams when activating a semi-persistent scheduling of one or more physical downlink channels (for example, PDSCH), one or more physical uplink channels (for example, PUSCH), or both associated with one or more of the directional beams 210. In some examples, the base station 105-*a* may allocate the one or more symbols when configuring an uplink grant of one or more physical downlink channels, one or more physical uplink channels, or both associated with one or more of the directional beams 210. The base station 105-*a* may allocate the one or more symbols based on a type of the uplink grant, which may be an uplink configured-grant type one (UL CG type 1) or an uplink configured-grant type two (UL CG type 2).

In some examples, the base station 105-*a* may allocate the one or more symbols between two or more different downlink physical channels, two or more different uplink physical channels, or both when the channels are to be received or transmitted with different directional beams when configuring one or more of a control resource set or a secondary synchronization signal channel relating to one or more physical downlink channels (for example, PDCCH), one or more physical uplink channels (for example, PUCCH), or both associated with one or more of the directional beams 210. In some examples, the base station 105-*a* may allocate the one or more symbols when configuring a reference signal configuration relating to one or more physical downlink channels, one or more physical uplink channels, or both associated with one or more directional beams. The reference signal configuration may include a channel state information reference signal configuration or a sounding reference signal configuration.

According to another example, the base station 105-*a* may allocate one or more symbols (for example, a temporal gap) between two or more different downlink physical channels, two or more different uplink physical channels, or both when the channels are to be received or transmitted, respectively, with different directional beams. In the examples outlined below, the duration for the UE 115-*a* to switch between the directional beams 210 may be inclusive of time resources of one or more physical channels associated with one or more of the directional beams 210. For example, time related to beam switching may be part of the resources of a channel when scheduling, activating, or configuring a channel.

In some examples, the base station 105-*a* may determine a duration for the UE 115-*a* to switch between the different directional beams 210 and may allocate one or more symbols associated with one or more physical downlink channels, one or more physical uplink channels, or both associated with one or more directional beams 210. The base station 105-*a* may then determine, based on the duration or the allocated one or more symbols, an overlap of a symbol of the one or more symbols into the duration or a partial overlap of the symbol of the one or more symbols into the duration. The symbol may also be referred to herein as an affected symbol, which may be a symbol that falls within a beam switch time (for example, a beam switch delay duration). A partial symbol may be defined as a last affected symbol (for example, in case a number of affected symbols is greater than one) that partially falls within a beam switch time and that has an overlap over the beam switch time that is greater than a cyclic prefix duration. Examples of defining one or more affected symbols or a partial symbol are described with reference to FIGS. 3 and 4.

Figure 3:
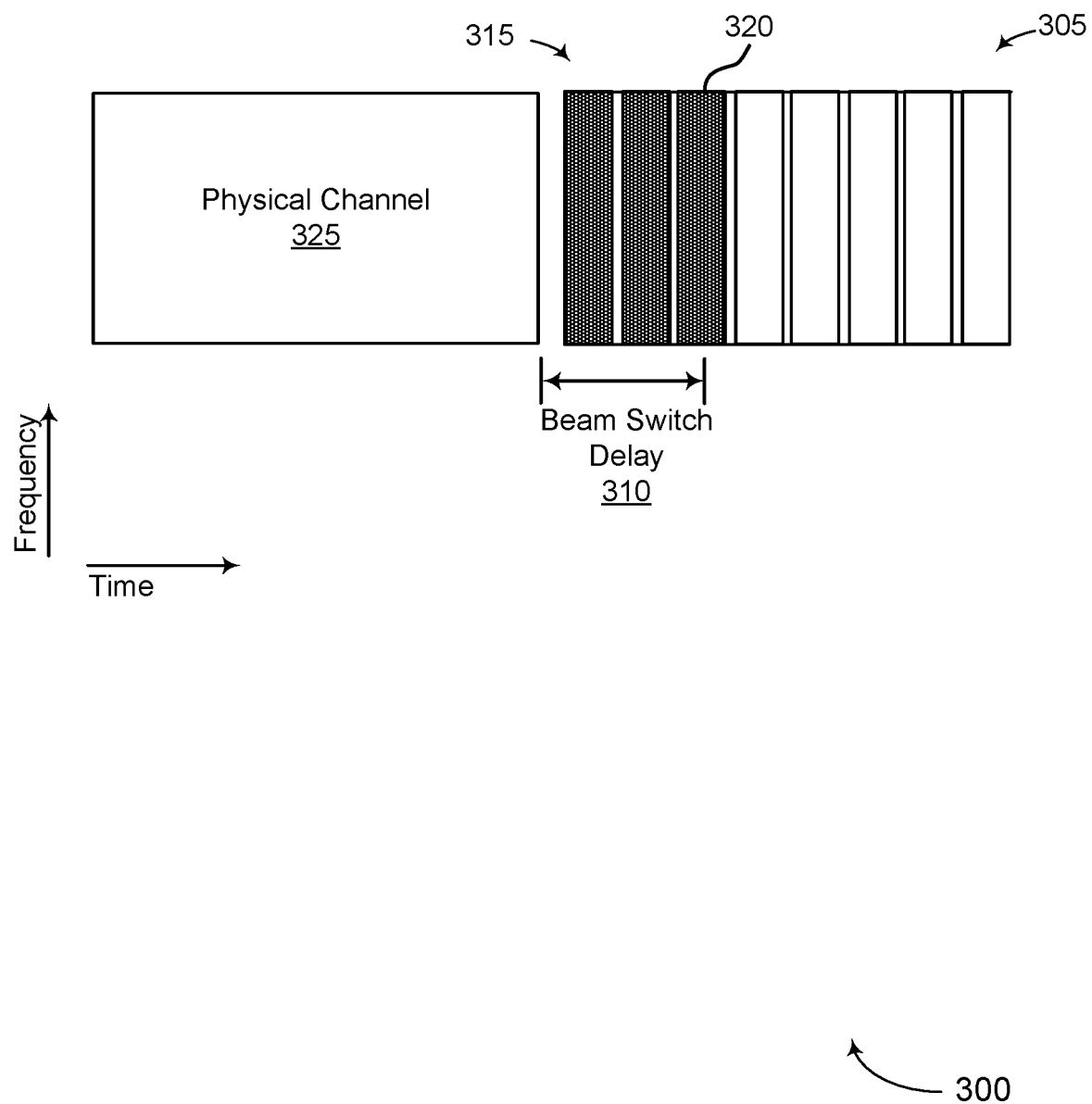
FIGS. 3 and 4 illustrate examples of affected symbols and partial symbols that support beam switching in a high radio frequency spectrum band in accordance with aspects of the present disclosure.

FIG. 3 illustrates an example 300 of affected symbols and partial symbols that overlap a beam switch time that supports beam switching in a high radio frequency spectrum band in accordance with aspects of the present disclosure. In the example of FIG. 3, a beam switch procedure may span one or more symbols 305 (for example, OFDM symbols). In some examples, the beam switch procedure may have a beam switch delay 310 associated with it. For example, the beam switch delay 310 may be a duration for the UE 115-*a*, with reference to FIG. 2, to switch between two or more directional beams 210. In some examples, one or more symbols 305 that overlap or partially overlap with the beam switch delay 310 may correspond to one or more affected symbols 315 or a partial symbol 320.

In some examples, with reference to FIG. 2, the base station 105-*a* and the UE 115-*a* may define an affected symbol 315 or a partial symbol 320 as one or more initial symbols of a second channel (for example, a physical channel) associated with a second transmit directional beam or a second receive directional beam proceeding from a first channel (for example, a physical channel 325) associated with a first transmit directional beam or a first receive directional beam. In some examples, the UE 115-*a* may be configured with the definition of an affected symbol or a partial symbol, for example, via radio resource control configuration. In some other examples, the base station 105-*a* may indicate to the UE 115-*a* via dynamic signaling, such as downlink control information, the definition of an affected symbol or a partial symbol.

Figure 4:
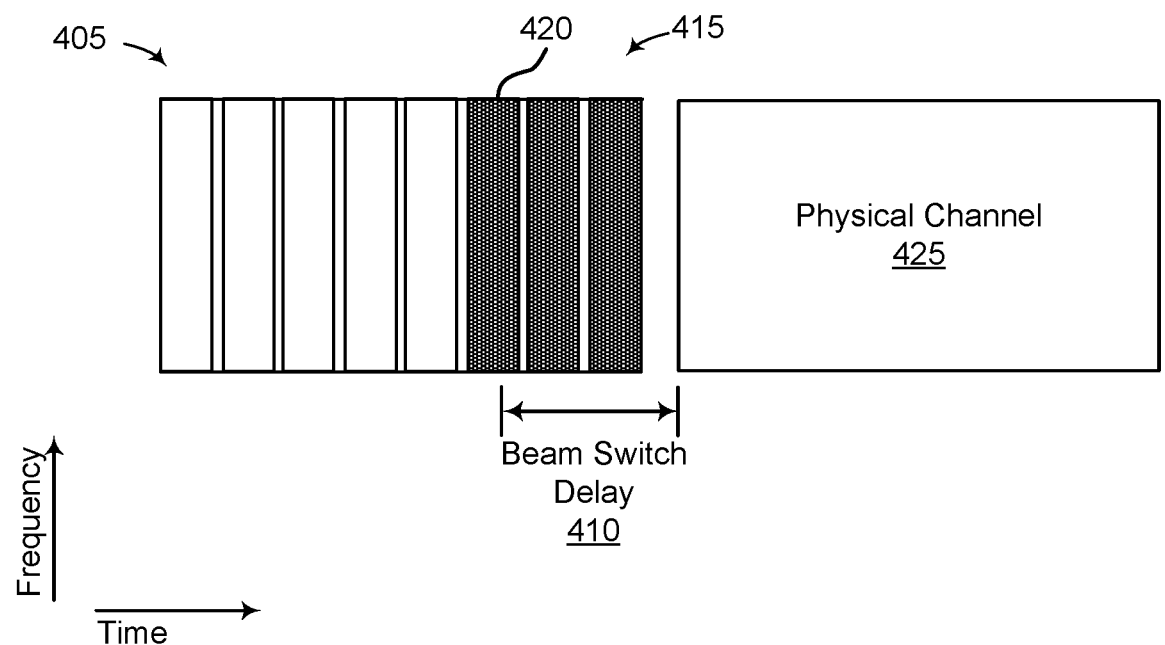

FIG. 4 illustrates an example 400 of affected symbols and partial symbols that overlap a beam switch time that supports beam switching in a high radio frequency spectrum band in accordance with aspects of the present disclosure. In the example of FIG. 4, a beam switch procedure may span one or more symbols 405 (for example, OFDM symbols). In some examples, the beam switch procedure may have a beam switch delay 410 associated with it. For example, the beam switch delay 410 may be a duration for the UE 115-*a*, with reference to FIG. 2, to switch between two or more directional beams 210. In some examples, one or more symbols 405 that overlap or partially overlap with the beam switch delay 410 may correspond to one or more affected symbols 415 or a partial symbol 420.

In some examples, with reference to FIG. 2, the base station 105-*a* or the UE 115-*a* may define an affected symbol 415 or a partial symbol 420 as a one or more ending symbols of a first channel (for example, a first physical channel) associated with a first transmit directional beam or a first receive directional beam that precedes a second channel (for example, physical channel 425) associated with a second transmit directional beam or a second receive directional beam. In some examples, the UE 115-*a* may be configured with the definition of an affected symbol or a partial symbol via radio resource control configuration. In some other examples, the base station 105-*a* may indicate to the UE 115-*a* via downlink control information the definition of an affected symbol or a partial symbol.

Returning to FIG. 2, one or more of the base station 105-*a* or the UE 115-*a* may determine an overlap of a symbol of one or more symbols into a duration (for example, a beam switch duration) or a partial overlap of the symbol of the one or more symbols into the duration based on one or more aspects. For example, one or more of the base station 105-*a* or the UE 115-*a* may determine one or more affected symbols and partial symbols from symbols allocated for a channel based on one or more aspects. In some examples, one or more of the base station 105-*a* or the UE 115-*a* may determine an overlap of a symbol of one or more symbols into a duration (for example, a beam switch duration) or a partial overlap of the symbol of the one or more symbols into the duration based on a duration for the UE 115-*a* to switch between different directional beams 210. For example, the base station 105-*a* may receive an indication of the duration via UE capability information or may determine a default value for the duration, and determine an overlap of a symbol of one or more symbols into a duration or a partial overlap of the symbol of the one or more symbols into the duration. Additionally, one or more of the base station 105-*a* or the UE 115-*a* may determine an overlap of a symbol of one or more symbols into a duration (for example, beam switch duration) or a partial overlap of the symbol of the one or more symbols into the duration based on the allocated symbols associated with one or more physical channels associated with the directional beams 210. Among other examples, one or more of the base station 105-*a* or the UE 115-*a* may determine an overlap of a symbol of one or more symbols into a duration (for example, a beam switch duration) or a partial overlap of the symbol of the one or more symbols into the duration based on one or more of a subcarrier spacing associated with the one or more symbols, a symbol duration associated with the one or more symbols, or a cyclic prefix duration associated with the one or more symbols.

In some examples, after a determination of an overlap of a symbol of one or more symbols into a duration (for example, a beam switch duration) or a partial overlap of the symbol of the one or more symbols into the duration, the base station 105-*a* and the UE 115-*a* may refine communications with each other based on the affected or partial symbols. In some examples, the affected symbols (including partial symbols) may not be transmitted or may be punctured (for example, coded bits corresponding to the affected symbols or partial symbols may not be transmitted). For example, the base station 105-*a* or the UE 115-*a* may puncture the symbol of the one or more symbols corresponding to the overlap or the partial overlap. In some examples, the base station 105-*a* or the UE 115-*a* may determine a transport block size based on the one or more symbols excluding the symbol of the one or more symbols associated with the overlap into the duration or the partial overlap into the duration. For example, the base station 105-*a* and the UE 115-*a* may determine a transport block size based on a number of allocated symbols or an actual number of data symbols excluding the affected symbols.

In some other examples, after a determination of an overlap of a symbol of one or more symbols into a duration (for example, a beam switch duration) or a partial overlap of the symbol of the one or more symbols into the duration, the base station 105-*a* and the UE 115-*a* may determine a rate matching operation. For example, the affected symbols (including partial symbols) may not be transmitted, and the transmission of the nonaffected symbols may be rate-matched around the affected symbols. In some examples, the number of coded bits to transmit via rate matching may be determined based on the number of available resources that do not include the affected symbols. For example, the base station 105-a and the UE 115-a may rate match around the symbol of the one or more symbols associated with the overlap into the duration or the partial overlap into the duration. In some other examples, after the determination of an overlap of a symbol of one or more symbols into a duration (for example, a beam switch duration) or a partial overlap of the symbol of the one or more symbols into the duration, the base station 105-a and the UE 115-a may determine that the partial overlap of the symbol of the one or more symbols into the duration is within an extended cyclic prefix duration, and may apply the extended cyclic prefix duration to the symbol associated with the partial overlap into the duration.

In some examples, the base station 105-a may configure the UE 115-a to perform one or more of puncturing, rate matching, or applying an extended cyclic prefix to the symbol of the one or more symbols corresponding to the overlap or the partial overlap based on a radio resource control configuration, or via MAC-CE signaling, or via dynamic signaling (for example, via downlink control information). In some examples, the base station 105-a may configure the UE 115-a to perform one or more of puncturing, rate matching, or applying an extended cyclic prefix to the symbol of the one or more symbols corresponding to the overlap or the partial overlap based on a modulation coding scheme. For example, the UE 115-a may perform puncturing or applying an extended cyclic prefix to the symbol of the one or more symbols corresponding to the overlap or the partial overlap based on a first modulation coding scheme. Additionally, the UE 115-a may perform rate matching to the symbol of the one or more symbols corresponding to the overlap or the partial overlap based on a second modulation coding scheme. In some examples, the second modulation coding scheme may be higher than the first modulation coding scheme.

In some examples, the base station 105-a may configure a demodulation reference signal pattern to take in to account the affected symbols. In some examples, the base station 105-a may shift a demodulation reference signal location to a second symbol of the one or more symbols that is non-overlapping with the duration. For example, with reference to FIG. 3, for a front-loaded demodulation reference signal, a location of the demodulation reference signal may be shifted to a first symbol of nonaffected symbols. In other examples, the base station 105-a may remove a demodulation reference signal location corresponding to an additional symbol of the one or more symbols associated with the overlap into the duration or the partial overlap into the duration. For example, with reference to FIG. 4, additional demodulation reference signal patterns may be removed. In some such examples, the base station 105-a may omit additional demodulation reference signal patterns corresponding to one or more symbols associated with the overlap into the duration or the partial overlap into the duration. The base station 105-a may, in some examples, transmit an indication of the demodulation reference signal pattern via radio resource control signaling. In some other examples, the base station 105-a may transmit an indication of the demodulation reference signal pattern via MAC-CE signaling. In other examples, the base station 105-a may transmit an indication of the demodulation reference signal pattern via dynamic signaling including downlink control information signaling.

Figure 5:
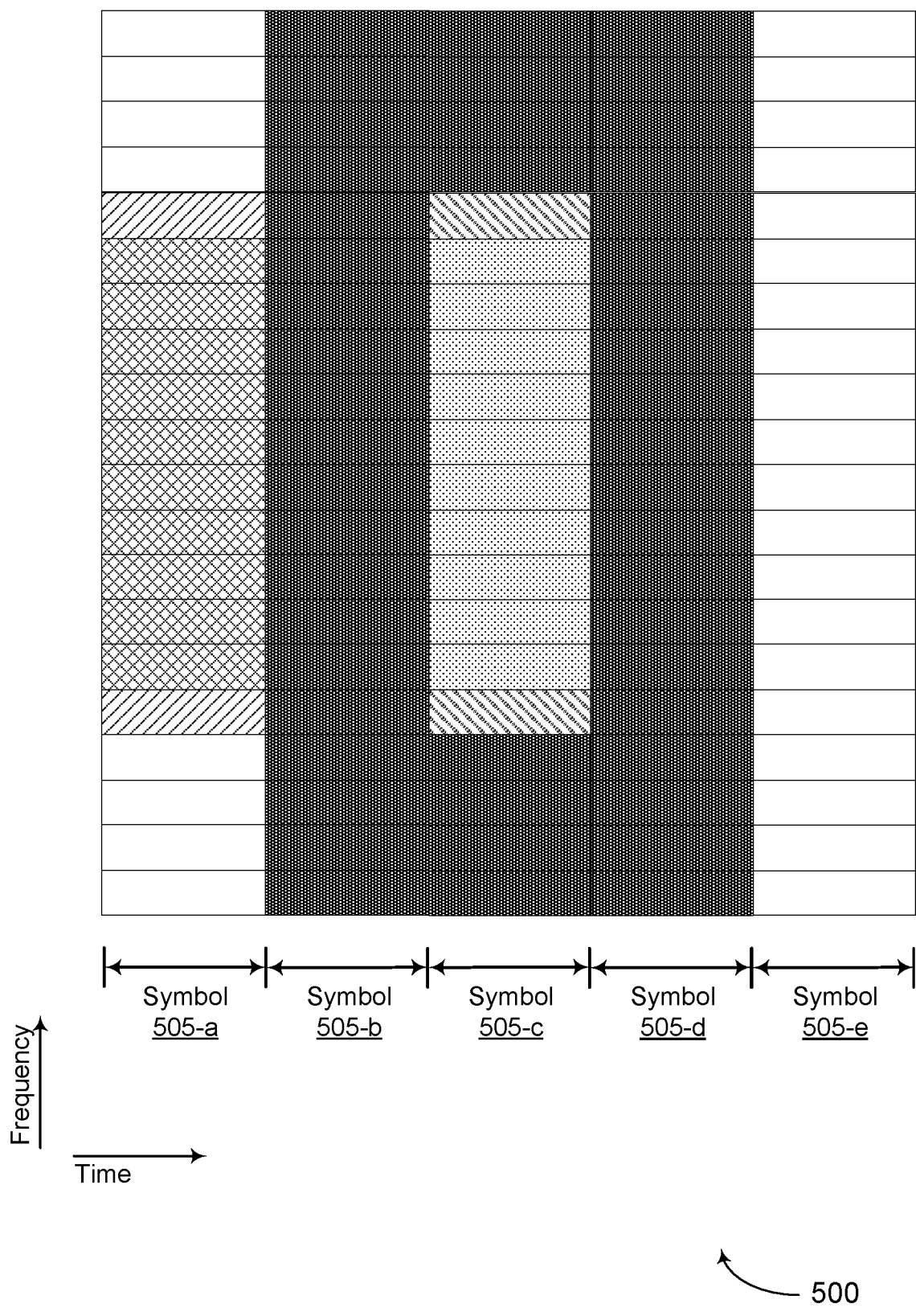
FIG. 5 illustrates an example of a synchronization signal physical broadcast channel (SS/PBCH) block that supports beam switching in a high radio frequency spectrum band in accordance with aspects of the present disclosure.

In some examples, the base station 105-a may configure the UE 115-a to mitigate one or more affected symbols or partial symbols in an SS/PBCH block. FIG. 5 illustrates an example of an SS/PBCH block 500 that supports beam switching in a high radio frequency spectrum band in accordance with aspects of the present disclosure. In some examples, the SS/PBCH block 500 may span over one or more symbols 505 (for example, OFDM symbols), and more specifically over symbols 505-a, 505-b, 505-c, and 505-d, which may be consecutive in a time domain. The SS/PBCH block 500 may occupy time and frequency resources related to the symbols 505-a, 505-b, 505-c, and 505-d, which may include symbol periods, or subcarriers, among other examples. For example, the SS/PBCH block 500 may map to a resource element corresponding to one or more of the symbols 505-a, 505-b, 505-c, and 505-d. The resource element may span one subcarrier by one symbol. In some examples, different SSBs with different indices may use different directional beams. In some other examples, the UE 115-a may transmit different SSBs back-to-back or may be transmit different SSBs before or after another physical channel with a different directional beam. In some examples, with reference to FIG. 2, the base station 105-a or the UE 115-a may configure an SSB over, for example, five symbols, in which the last symbol (for example, fifth symbol 505-e) is a partial symbol. The last symbol may be used by the UE 115-a to transmit a PBCH and also used as a beam switch gap. In some examples, a single carrier waveform with time domain processing may be more flexible to make use of the partial symbol.

Returning to FIG. 2, in some examples, a control resource set duration may span one, two, or three consecutive symbols, in which the UE 115-a may receive a physical channel, such as a PDCCH. Each control resource set may be associated with a timing configuration indication state, for example, for one or more directional beams 205 or directional beams 210. In some examples, the base station 105-a and the UE 115-a may configure a control resource set to span more than three contiguous symbols to allow for beam switching after a physical channel, such as a PDCCH. Alternatively, in some examples, the base station 105-a and the UE 115-a may configure a control resource set to span more than three contiguous symbols or noncontiguous symbols for control resource set configuration to allow beam switching within the control resource set if the control resource set or physical channel (for example, PDCCH) is defined for two or more timing configuration indication states, which may indicate beam diversity for PDCCH.

The base station 105-a may therefore configure the UE 115-a to support directional communications according to the allocated one or more symbols between different physical channels that may be either exclusive of resources related to the physical channels or inclusive of resource of the physical channels. The base station 105-a and the UE 115-a may thus support one or more features for improvements to power consumption, reliability for beam switching, spectral efficiency, higher data rates and, in some examples, may promote low latency for beam switching operations, among other benefits.

Figure 6:
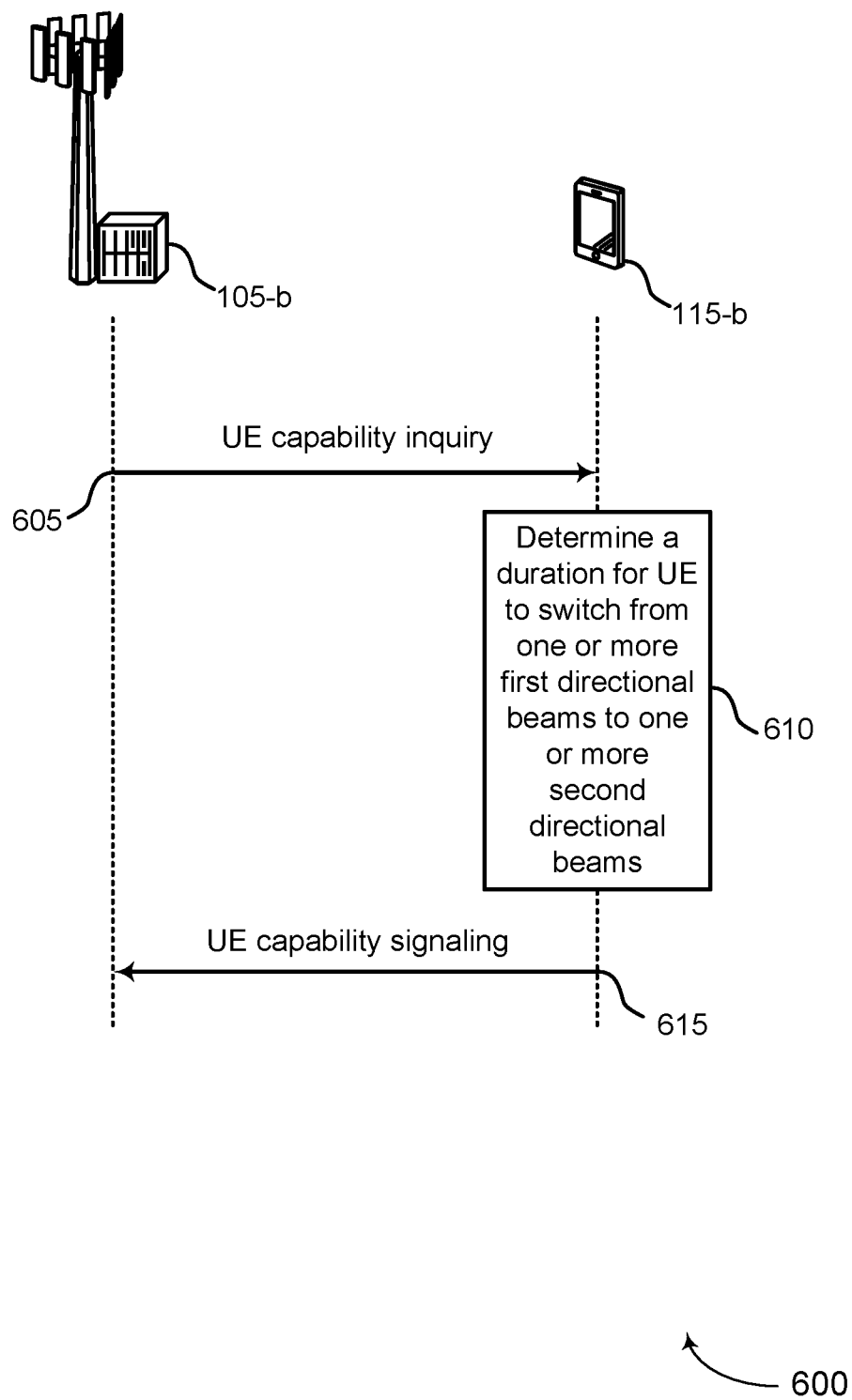
FIGS. 6-8 illustrate examples of process flows that support beam switching in a high radio frequency spectrum band in accordance with aspects of the present disclosure.

FIG. 6 illustrates an example of a process flow 600 that supports beam switching in a high radio frequency spectrum band in accordance with aspects of the present disclosure. The process flow 600 may implement aspects of the wireless communications systems 100 and 200 described with reference to FIGS. 1 and 2, respectively. For example, the process flow 600 may be based on a configuration by a base station 105-*b*, and implemented by a UE 115-*b*, for supporting beam switching in a high radio frequency spectrum band, as described with reference to FIGS. 1 and 2. The base station 105-*b* and the UE 115-*b* may be examples of a base station 105 and a UE 115, as described with reference to FIG. 1. In the following description of the process flow 600, other operations may be added to the process flow 600. In the example of FIG. 6, the base station 105-*b* and the UE 115-*b* may be in communication with each other via a terrestrial network. The process flow 600 may support higher data rates or improved communication reliability, among other benefits.

At 605, the base station 105-*b* may transmit a UE capability inquiry to the UE 115-*b*. For instance, the base station 105-*b* may provide the UE capability inquiry via a radio resource control configuration message. At 610, the UE 115-*b* may determine a duration for the UE 115-*b* to switch from one or more first directional beams to one or more second directional beams (for example, based on receiving the UE capability inquiry or the radio resource control signaling that includes the UE capability inquiry). One or more of the one or more first directional beams or the one or more second directional beams may include one or more downlink receive directional beams corresponding to one or more physical downlink channels or one or more uplink transmit directional beams corresponding to one or more physical uplink channels. The one or more physical downlink channels may include one or more of a PDCCH, a PDSCH or a SS/PBCH block, and the one or more physical uplink channels may include one or more of a PUCCH or a PUSCH. At 615, the UE 115-*b* may transmit UE capability signaling including an indication of the duration to the base station 105-*b*.

The operations performed by the base station 105-*b* and the UE 115-*b* as part of, but not limited to, process flow 600 may provide improvements to UE 115-*b* beam switch procedures. Furthermore, the operations performed by the base station 105-*b* and the UE 115-*b* as part of, but not limited to, process flow 600 may provide benefits and enhancements to the operation of the UE 115-*b*. For example, the described UE capability signaling including an indication of the duration related to a beam switch in the process flow 600 may support improved data rates and enhanced transmission reliability, among other advantages.

Figure 7:
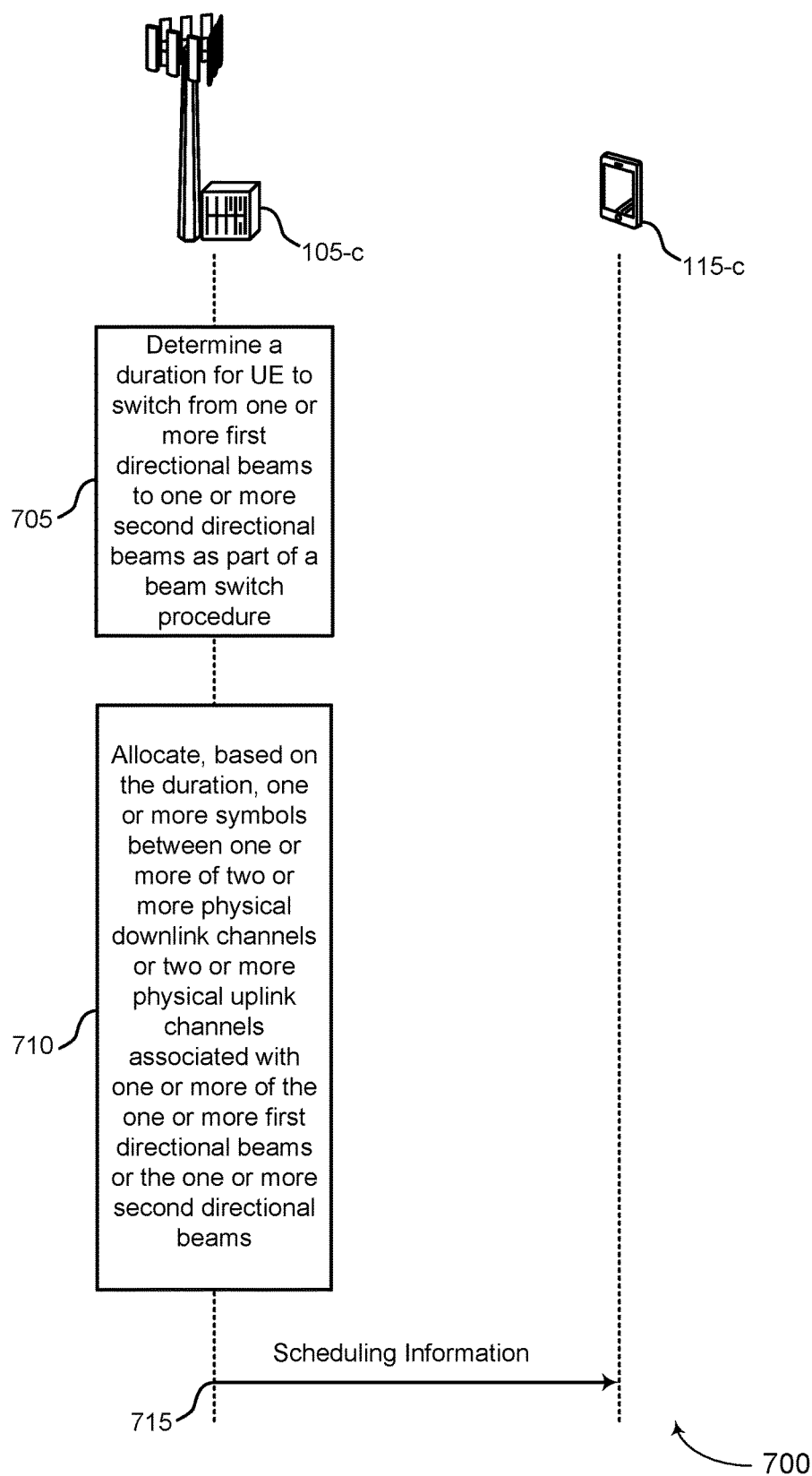

FIG. 7 illustrates an example of a process flow 700 that supports beam switching in a high radio frequency spectrum band in accordance with aspects of the present disclosure. The process flow 700 may implement aspects of the wireless communications systems 100 and 200 described with reference to FIGS. 1 and 2, respectively. For example, the process flow 700 may be based on a configuration by a base station 105-*c*, and implemented by a UE 115-*c*, for supporting beam switching in a high radio frequency spectrum band, as described with reference to FIGS. 1 and 2. The base station 105-*c* and the UE 115-*c* may be examples of a base station 105 and a UE 115 as described with reference to FIG. 1. In the following description of the process flow 700, other operations may be added to the process flow 700. In the example of FIG. 7, the base station 105-*c* and the UE 115-*c* may be in communication with each other via a terrestrial network. The process flow 700 may support higher data rates or improved communication reliability, among other benefits.

At 705, the base station 105-*c* may determine a duration for the UE 115-*c* to switch from one or more first directional beams to one or more second directional beams as part of a beam switch procedure. At 710, the base station 105-*c* may allocate, based on the duration, one or more symbols between one or more of two or more physical downlink channels or two or more physical uplink channels associated with one or more of the one or more first directional beams or the one or more second directional beams. The one or more symbols may represent a gap between physical channels of one or more of the two or more physical downlink channels or the two or more physical uplink channels. At 715, the base station 105-*c* may transmit scheduling information including an indication of the one or more symbols to the UE 115-*c*. The UE 115-*c* may receive the scheduling information and may determine an overlap or a partial overlap of a symbol of the one or more symbols into a duration for the UE 115-*c* to switch from one or more first directional beams to one or more second directional beams as part of a beam switch procedure. The UE 115-*c* may communicate with the base station 105-*c* based on the determining.

Figure 8:
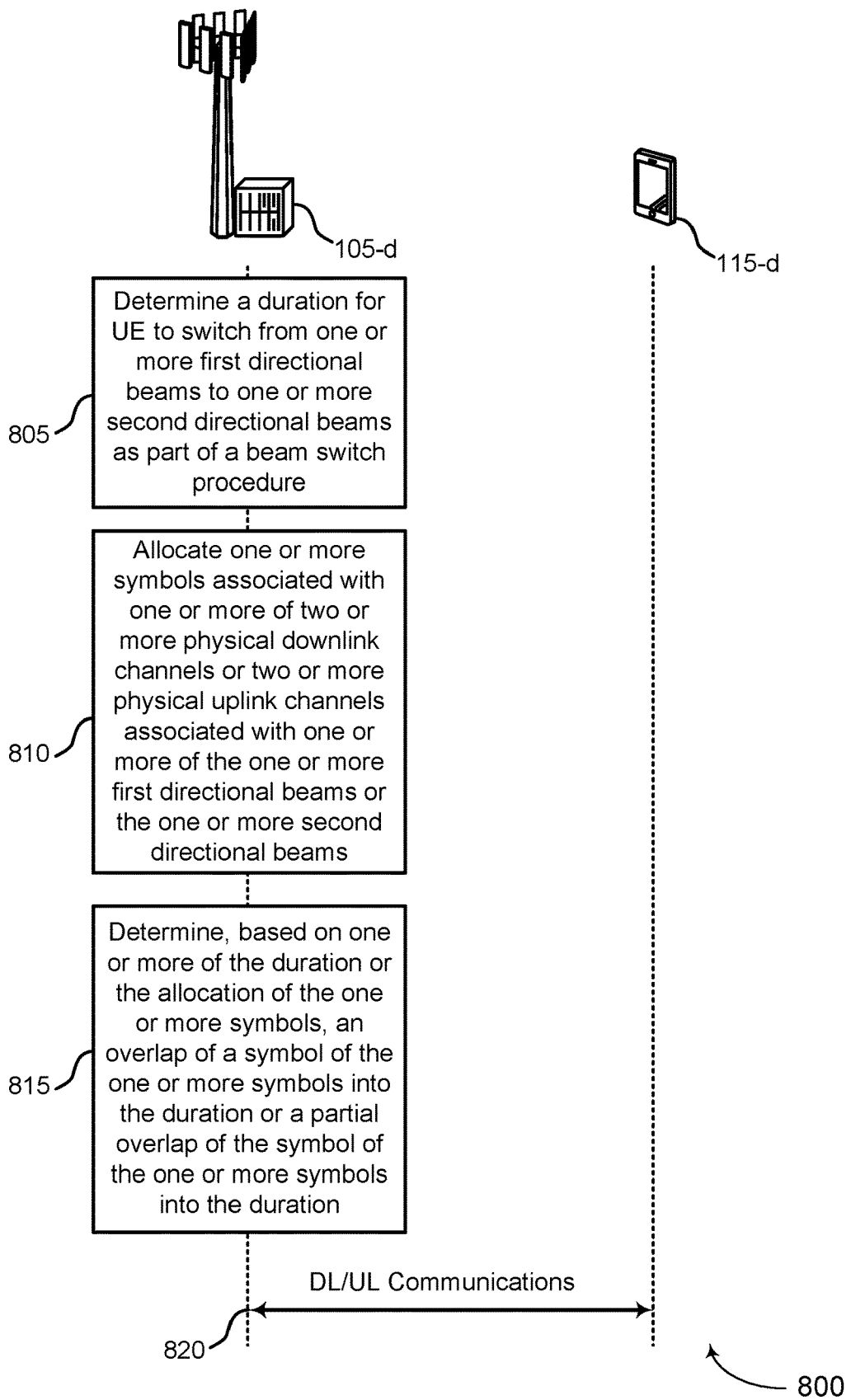

FIG. 8 illustrates an example of a process flow 800 that supports beam switching in a high radio frequency spectrum band in accordance with aspects of the present disclosure. The process flow 800 may implement aspects of the wireless communications systems 100 and 200 as described with reference to FIGS. 1 and 2, respectively. For example, the process flow 800 may be based on a configuration by a base station 105-*d*, and implemented by a UE 115-*d*, for supporting beam switching in a high radio frequency spectrum band, as described with reference to FIGS. 1 and 2. The base station 105-*d* and the UE 115-*d* may be examples of a base station 105 and a UE 115 as described with reference to FIG. 1. In the following description of the process flow 800, other operations may be added to the process flow 800. In the example of FIG. 8, the base station 105-*d* and the UE 115-*d* may be in communication with each other via a terrestrial network. The process flow 800 may support higher data rates or improved communication reliability, among other benefits.

At 805, the base station 105-*d* may determine a duration for the UE 115-*d* to switch from one or more first directional beams to one or more second directional beams as part of a beam switch procedure. At 810, the base station 105-*d* may allocate one or more symbols associated with one or more of two or more physical downlink channels or two or more physical uplink channels associated with one or more of the one or more first directional beams or the one or more second directional beams. At 815, the base station 105-*d* may determine, based on one or more of the duration or the allocation of the one or more symbols, an overlap of a symbol of the one or more symbols into the duration or a partial overlap of the symbol of the one or more symbols into the duration. At 820, the base station 105-*d* and the UE 115-*d* may perform downlink or uplink communications based on the determining (for example, at 815).

Figure 9:
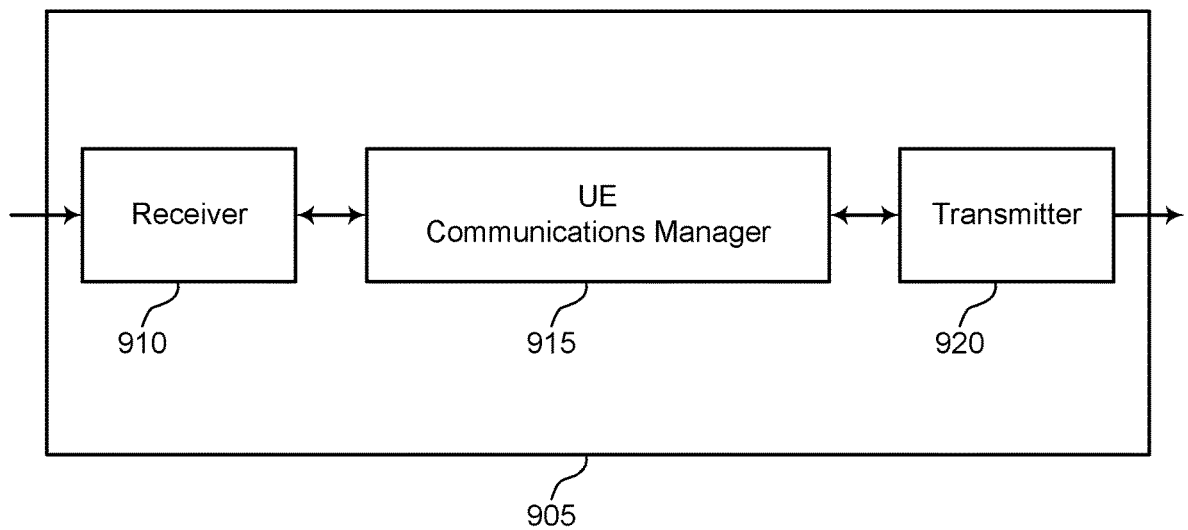
FIGS. 9 and 10 show block diagrams of devices that support beam switching in a high radio frequency spectrum band in accordance with aspects of the present disclosure.

FIG. 9 shows a block diagram of a device 905 that supports beam switching in a high radio frequency spectrum band in accordance with aspects of the present disclosure. The device 905 may be an example of aspects of a UE 115 as described with reference to FIG. 1. The device 905 may include a receiver 910, a UE communications manager 915, and a transmitter 920. The UE communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to beam switching in a high radio frequency spectrum band, among other examples). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive, from a base station, a request for UE capability information, determine a duration for the UE to switch from one or more first directional beams to one or more second directional beams, and transmit, based on determining the duration, the UE capability information including an indication of the duration to the base station. Additionally, the UE communications manager 915 may receive, from a base station, scheduling information including an allocation of one or more symbols corresponding to one or more physical downlink channels or one or more physical uplink channels; determine an overlap or a partial overlap of a symbol of the one or more symbols into a duration for the UE to switch from one or more first directional beams to one or more second directional beams as part of a beam switching procedure; and communicate with the base station based on the determining. The UE communications manager 915 may be an example of aspects of the UE communications manager 1210 described with reference to FIG. 12. The methods performed by UE communications manager 915 may support improvements to power consumption, reliability for beam switching, spectral efficiency, higher data rates and, in some examples, low latency for beam switching operations, among other benefits.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
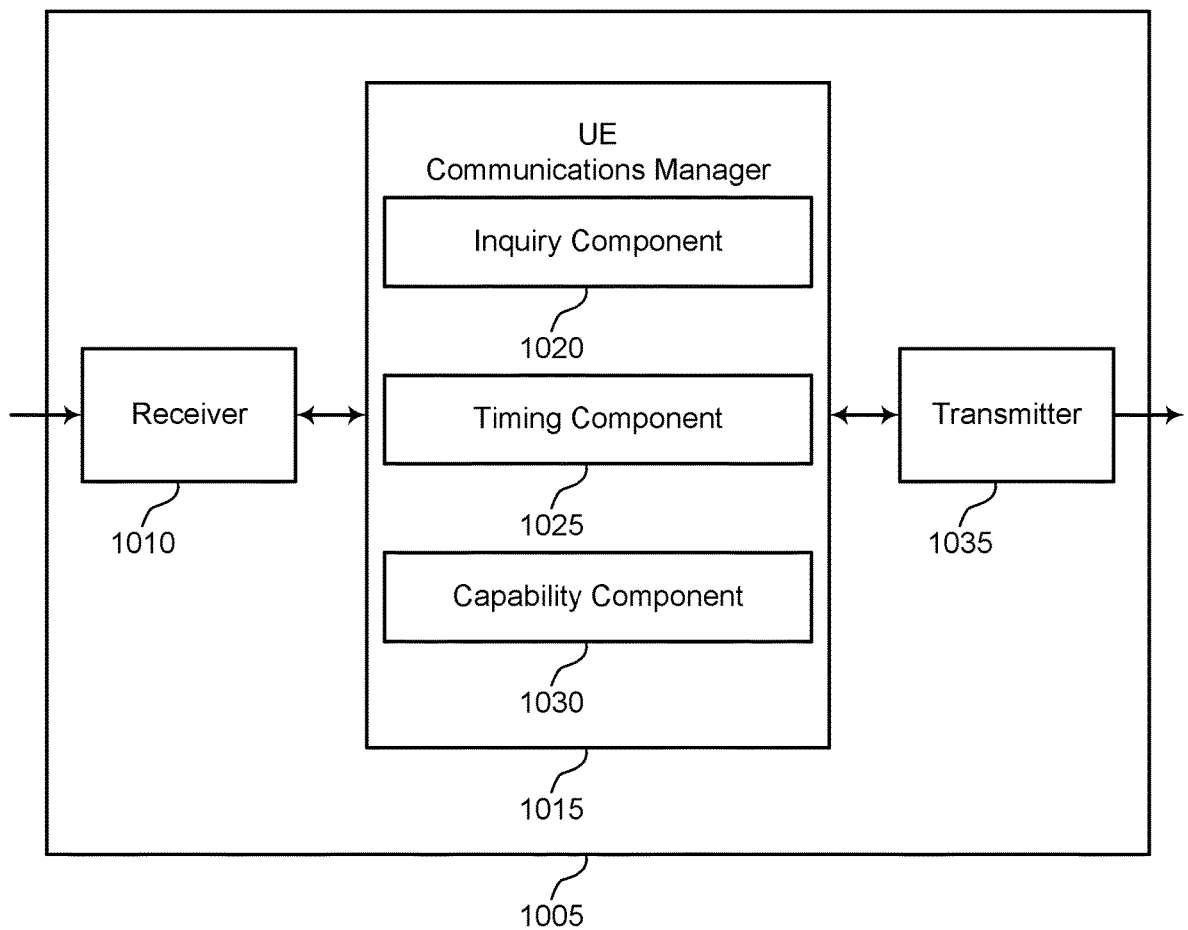

FIG. 10 shows a block diagram of a device 1005 that supports beam switching in a high radio frequency spectrum band in accordance with aspects of the present disclosure. The device 1005 may be an example of aspects of a device 905 or a UE 115 as described with reference to FIG. 1. The device 1005 may include a receiver 1010, a UE communications manager 1015, and a transmitter 1035. The UE communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to beam switching in a high radio frequency spectrum band, among other examples). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described with reference to FIG. 9. The UE communications manager 1015 may include an inquiry component 1020, a timing component 1025, and a capability component 1030. The UE communications manager 1015 may be an example of aspects of the UE communications manager 1210 described with reference to FIG. 12.

The inquiry component 1020 may receive, from a base station, a request for UE capability information. The timing component 1025 may determine a duration for the UE to switch from one or more first directional beams to one or more second directional beams. The capability component 1030 may transmit, based on determining the duration, the UE capability information including an indication of the duration to the base station. The methods performed by one or more of the inquiry component 1020, the timing component 1025, or the capability component 1030 may support improvements to power consumption, reliability for beam switching, spectral efficiency, higher data rates and, in some examples, low latency for beam switching operations, among other benefits.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a single antenna or a set of antennas.

Figure 11:
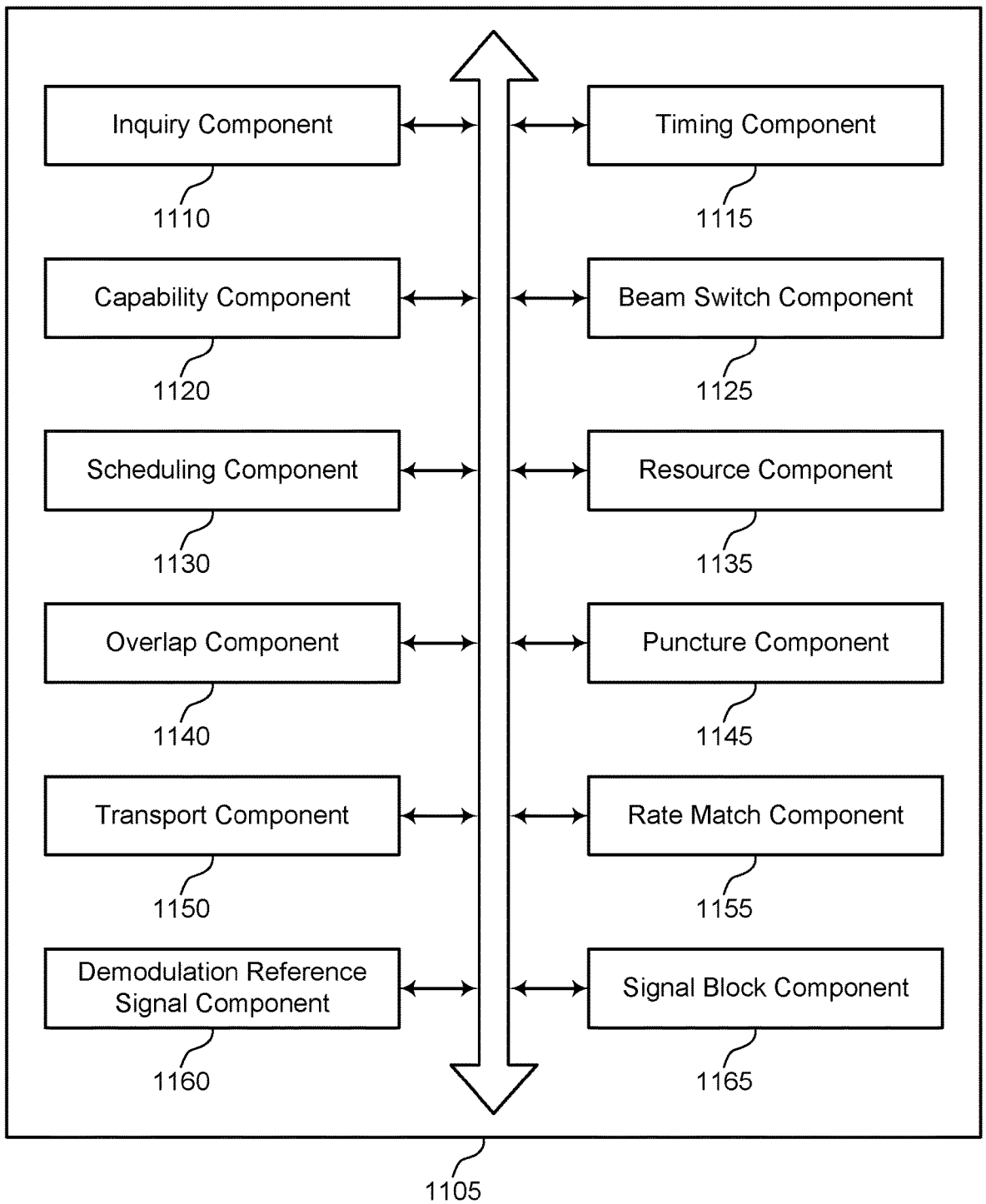
FIG. 11 shows a block diagram of a UE communications manager that supports beam switching in a high radio frequency spectrum band in accordance with aspects of the present disclosure.

FIG. 11 shows a block diagram of a UE communications manager 1105 that supports beam switching in a high radio frequency spectrum band in accordance with aspects of the present disclosure. The UE communications manager 1105 may be an example of aspects of a UE communications manager 915, a UE communications manager 1015, or a UE communications manager 1210 described with reference to one or more of FIG. 9, 10, or 12. The UE communications manager 1105 may include an inquiry component 1110, a timing component 1115, a capability component 1120, a beam switch component 1125, a scheduling component 1130, a resource component 1135, an overlap component 1140, a puncture component 1145, a transport component 1150, a rate match component 1155, a demodulation reference signal component 1160, and a signal block component 1165. Each of these components may communicate, directly or indirectly, with one another (for example, via one or more buses).

The inquiry component 1110 may receive, from a base station, a request for UE capability information. The inquiry component 1110 may receive, from a base station, a radio resource control configuration message. The timing component 1115 may determine a duration for the UE to switch from one or more first directional beams to one or more second directional beams. In some examples, the timing component 1115 may determine the duration to switch from one or more of one or more first downlink receive directional beams to one or more second downlink receive directional beams or one or more first uplink transmit directional beams to one or more second uplink transmit directional beams. In some examples, one or more of the one or more first directional beams or the one or more second directional beams includes one or more downlink receive directional beams corresponding to one or more physical downlink channels or one or more uplink transmit directional beams corresponding to one or more physical uplink channels. In some examples, the timing component 1115 may determine the duration based on receiving one or more of the request for UE capability information or the radio resource control configuration message.

The capability component 1120 may transmit, based on determining the duration, the UE capability information including an indication of the duration to the base station. In some examples, the capability component 1120 may determine a capability of the UE for simultaneous directional beam reception, or directional beam transmission, or both based on the UE capability information, in which determining the duration for the UE to switch from the one or more first directional beams to the one or more second directional beams is based on the UE capability of simultaneous directional beam reception, or directional beam transmission, or both. In some examples, transmitting the UE capability information includes transmitting signaling including the indication of the duration to the base station. In some examples, the UE capability information includes an indication of a frequency spectrum band associated with one or more of the one or more first directional beams or the one or more second directional beams associated with one or more of the one or more first directional beams or the one or more second directional beams.

The beam switch component 1125 may perform a beam switch procedure, the beam switch procedure including switching from the one or more first directional beams to the one or more second directional beams, in which the duration for the UE to switch from the one or more first directional beams to the one or more second directional beams excludes time resources of one or more physical channels associated with one or more of the one or more first directional beams or the one or more second directional beams.

The scheduling component 1130 may receive scheduling information including an allocation of one or more symbols corresponding to one or more physical downlink channels or one or more physical uplink channels, in which one or more of the one or more first directional beams or the one or more second directional beams includes one or more downlink receive directional beams corresponding to the one or more physical downlink channels or one or more uplink transmit directional beams corresponding to the one or more physical uplink channels. In some examples, the scheduling component 1130 may receive the scheduling information via radio resource control configuration. In some examples, the scheduling component 1130 may receive the scheduling information via downlink control information signaling. In some examples, a symbol of the one or more symbols is neighboring a beginning symbol of a physical channel associated with a directional beam of the one or more second directional beams that precedes a physical channel associated with a directional beam of the one or more first directional beams. In some examples, a symbol of the one or more symbols is neighboring an ending symbol of a physical channel associated with a directional beam of the one or more first directional beams that precedes a physical channel associated with a directional beam of the one or more second directional beams.

The resource component 1135 may determine one or more of a subcarrier spacing associated with the one or more symbols, a symbol duration associated with the one or more symbols, or a cyclic prefix duration associated with the one or more symbols. In some examples, the resource component 1135 may determine a control resource set configuration over one or more contiguous symbols or noncontiguous symbols of the one or more symbols for the switch from the one or more first directional beams to the one or more second directional beams. In some examples, the resource component 1135 may determine that the control resource set configuration supports two or more transmission configuration indication states. In some examples, the resource component 1135 may perform the beam switch procedure based on the determining.

The overlap component 1140 may determine an overlap of a symbol of the one or more symbols into the duration, or a partial overlap of the symbol of the one or more symbols into the duration, based on one or more of the subcarrier spacing, the symbol duration associated with the symbol of the one or more symbols, or the cyclic prefix duration associated with the symbol of the one or more symbols. In some examples, the overlap component 1140 may determine an overlap of a symbol of the one or more symbols into the duration, or a partial overlap of the symbol of the one or more symbols into the duration, based on the duration for the UE to switch from one or more first directional beams to one or more second directional beams. In some examples, the overlap component 1140 may determine that a partial overlap of a symbol of the one or more symbols into the duration is within an extended cyclic prefix duration. In some examples, the overlap component 1140 may apply the extended cyclic prefix duration to the symbol associated with the partial overlap into the duration. In some examples, the overlap component 1140 may communicate with the base station based on the applying.

The puncture component 1145 may puncture the symbol of the one or more symbols based on the determining. In some examples, the puncture component 1145 may communicate with the base station based on the puncturing. In some examples, the puncture component 1145 may determine a modulation coding scheme, in which puncturing the symbol of the one or more symbols is based on the modulation coding scheme. In some examples, determining coded bits corresponding to the punctured symbol, in which communicating with the base station includes decoding a transmission from the base station using remaining coded bits and refraining from using the coded bits corresponding to the punctured symbol for the decoding.

The transport component 1150 may determine a transport block size based on the one or more symbols excluding a symbol of the one or more symbols associated with an overlap into the duration or a partial overlap into the duration. In some examples, the transport component 1150 may communicate with the base station based on the transport block size. The rate match component 1155 may determine a rate matching operation for one or more of the one or more physical downlink channels or the one or more physical uplink channels associated with one or more of the one or more first directional beams or the one or more second directional beams, in which the rate matching operation includes rate matching around a symbol of the one or more symbols associated with an overlap into the duration or a partial overlap into the duration based on the determining. In some examples, the rate match component 1155 may communicate with the base station based on the rate matching operation. In some examples, the rate match component 1155 may determine a modulation coding scheme, in which determining the rate matching operation is based on the modulation coding scheme. In some examples, the rate match component 1155 may determine a number of coded bits to transmit to the base station based on the one or more symbols excluding the symbol of the one or more symbols associated with the overlap into the duration or the partial overlap into the duration, in which communicating with the base station includes rate matching using remaining coded bits and refraining from using the coded bits corresponding to the punctured symbol for the rate matching.

The demodulation reference signal component 1160 may determine, based on an overlap of a symbol of the one or more symbols into the duration or a partial overlap of the symbol of the one or more symbols into the duration, a demodulation reference signal pattern associated with one or more of the one or more physical downlink channels or the one or more physical uplink channels associated with one or more of the one or more first directional beams or the one or more second directional beams. In some examples, the demodulation reference signal component 1160 may determine a shift of a demodulation reference signal location to a second symbol of the one or more symbols that is non-overlapping with the duration. In some examples, the demodulation reference signal component 1160 may determine a removal of an additional demodulation reference signal location corresponding to an additional symbol of the one or more symbols associated with the overlap into the duration or the partial overlap into the duration, the demodulation reference signal location associated with one or more of the one or more physical downlink channels or the one or more physical uplink channels associated with one or more of the one or more first directional beams or the one or more second directional beams.

The signal block component 1165 may receive one or more of a synchronization signal physical broadcast channel block over the symbol of the one or more symbols that has the partial overlap into the duration, in which the one or more symbols correspond to one or more synchronization signal blocks having one or more synchronization signal block indices corresponding to one or more of the one or more first directional beams or the one or more second directional beams. The methods performed by one or more of the inquiry component 1110, the timing component 1115, the capability component 1120, the beam switch component 1125, the scheduling component 1130, the resource component 1135, the overlap component 1140, the puncture component 1145, the transport component 1150, the rate match component 1155, the demodulation reference signal component 1160, or the signal block component 1165 may support improvements to power consumption, reliability for beam switching, spectral efficiency, higher data rates and, in some examples, low latency for beam switching operations, among other benefits.

Figure 12:
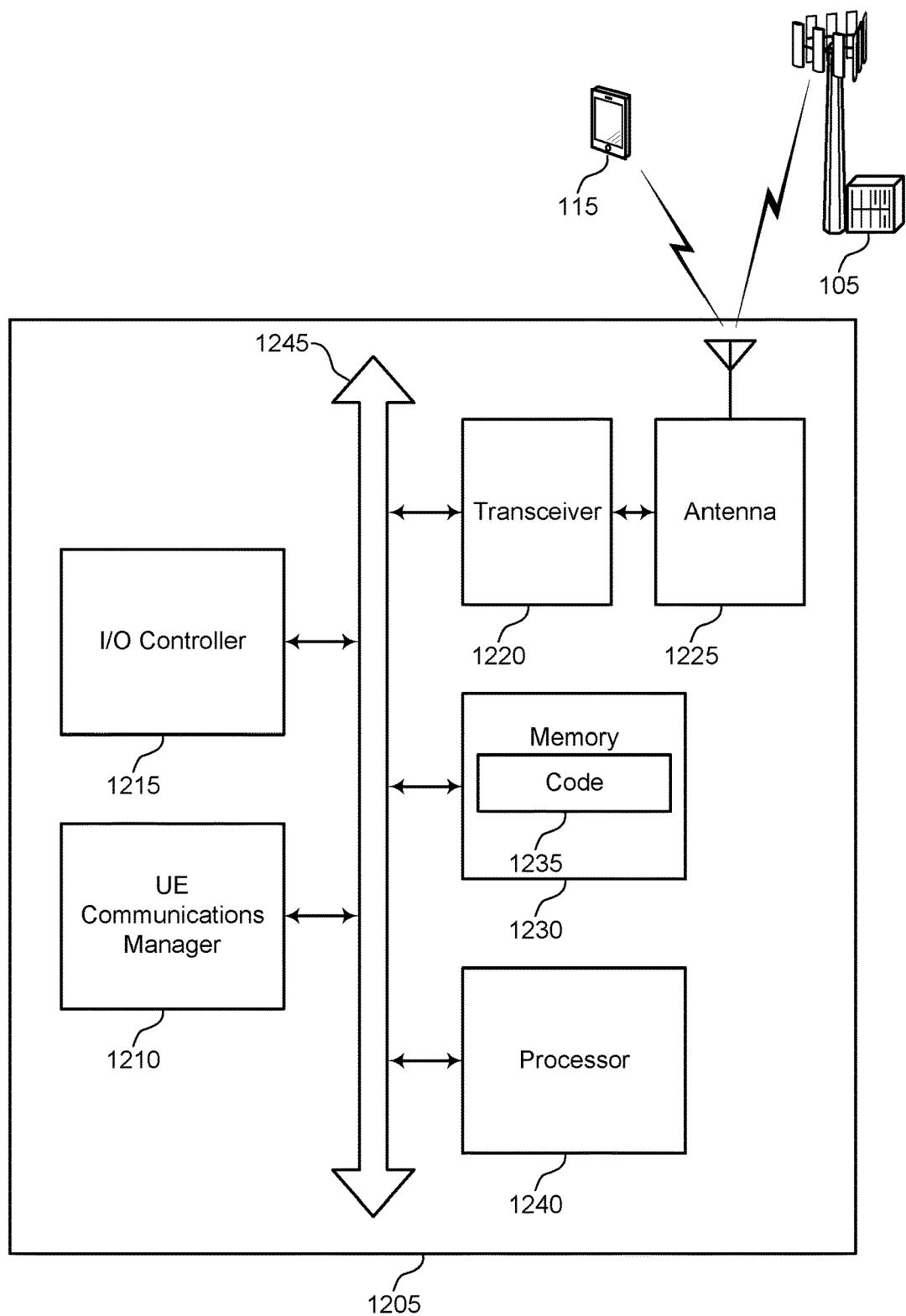
FIG. 12 shows a diagram of a system including a device that supports beam switching in a high radio frequency spectrum band in accordance with aspects of the present disclosure.

FIG. 12 shows a diagram of a system including a device 1205 that supports beam switching in a high radio frequency spectrum band in accordance with aspects of the present disclosure. The device 1205 may be an example of or include the components of device 905, device 1005, or a UE 115 as described with reference to one or more of FIG. 9, 10, or 1. The device 1205 may include components for bi-directional voice and data communications including components for transmitting and receiving communications, including a UE communications manager 1210, an I/O controller 1215, a transceiver 1220, an antenna 1225, memory 1230, and a processor 1240. The UE communications manager 1210 can be implemented, at least in part, by one or both of a modem and the processor 1240. These components may be in electronic communication via one or more buses (for example, bus 1245).

The UE communications manager 1210 may receive, from a base station, a request for UE capability information, determine a duration for the UE to switch from one or more first directional beams to one or more second directional beams, and transmit, based on determining the duration, the UE capability information including an indication of the duration to the base station. Additionally, the UE communications manager 1210 may receive, from a base station, scheduling information including an allocation of one or more symbols corresponding to one or more physical downlink channels or one or more physical uplink channels; determine an overlap or a partial overlap of a symbol of the one or more symbols into a duration for the UE to switch from one or more first directional beams to one or more second directional beams as part of a beam switching procedure; and communicate with the base station based on the determining. The methods performed by UE communications manager 1210 may support improvements to power consumption, reliability for beam switching, spectral efficiency, higher data rates and, in some examples, low latency for beam switching operations, among other benefits.

The I/O controller 1215 may manage input and output signals for the device 1205. The I/O controller 1215 may also manage peripherals not integrated into the device 1205. In some examples, the I/O controller 1215 may represent a physical connection or port to an external peripheral. In some examples, the I/O controller 1215 may utilize an operating system such as iOS, ANDROID, MS-DOS, MS-WINDOWS, OS/2, UNIX, LINUX, or another known operating system. In other examples, the I/O controller 1215 may represent or interact with a modem, a keyboard, a mouse, a touchscreen, or a similar device. In some examples, the I/O controller 1215 may be implemented as part of a processor. In some examples, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some examples, the device 1205 may include more than one antenna 1225, in which the device 1205 may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described with reference to FIG. 12. In some examples, the memory 1230 may contain, among other things, a basic input/output system (BIOS) which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described with reference to FIG. 12.

The processor 1240 may include an intelligent hardware device, (for example, a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some examples, the processor 1240 may be configured to operate a memory array using a memory controller. In other examples, a memory controller may be integrated into the processor 1240. The processor 1240 may be configured to execute computer-readable instructions stored in a memory (for example, the memory 1230) to cause the device 1205 to perform various functions (for example, functions or tasks supporting beam switching in a high radio frequency spectrum band).

Figure 13:
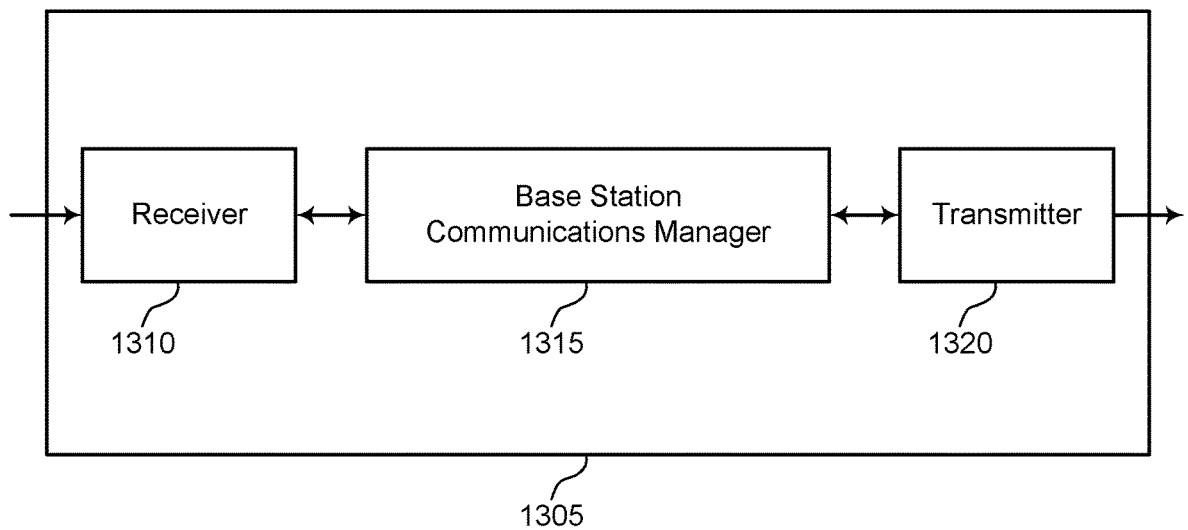
FIGS. 13 and 14 show block diagrams of devices that support beam switching in a high radio frequency spectrum band in accordance with aspects of the present disclosure.

FIG. 13 shows a block diagram of a device 1305 that supports beam switching in a high radio frequency spectrum band in accordance with aspects of the present disclosure. The device 1305 may be an example of aspects of a base station 105 as described with reference to FIG. 1. The device 1305 may include a receiver 1310, a base station communications manager 1315, and a transmitter 1320. The base station communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to beam switching in a high radio frequency spectrum band, among other examples). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may determine a duration for a UE to switch from one or more first directional beams to one or more second directional beams as part of a beam switch procedure, allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmit scheduling information including an indication of the one or more symbols to the UE.

The base station communications manager 1315 may also determine a duration for a UE to switch from one or more first directional beams to one or more second directional beams as part of a beam switch procedure, allocate one or more symbols associated with one or more of one or more physical downlink channels or one or more physical uplink channels associated with one or more of the one or more first directional beams or the one or more second directional beams, determine, based on one or more of the duration or the allocation of the one or more symbols, an overlap of a symbol of the one or more symbols into the duration or a partial overlap of the symbol of the one or more symbols into the duration, and communicate with the UE based on the determining. The base station communications manager 1315 may be an example of aspects of the base station communications manager 1610 described with reference to FIG. 16. The methods performed by base station communications manager 1315 may support improvements to power consumption, reliability for beam switching, spectral efficiency, higher data rates and, in some examples, low latency for beam switching operations, among other benefits.

The transmitter 1320 may transmit signals generated by other components of the device 1305. In some examples, the transmitter 1320 may be collocated with a receiver 1310 in a transceiver component. For example, the transmitter 1320 may be an example of aspects of the transceiver 1620 described with reference to FIG. 16. The transmitter 1320 may utilize a single antenna or a set of antennas.

Figure 14:
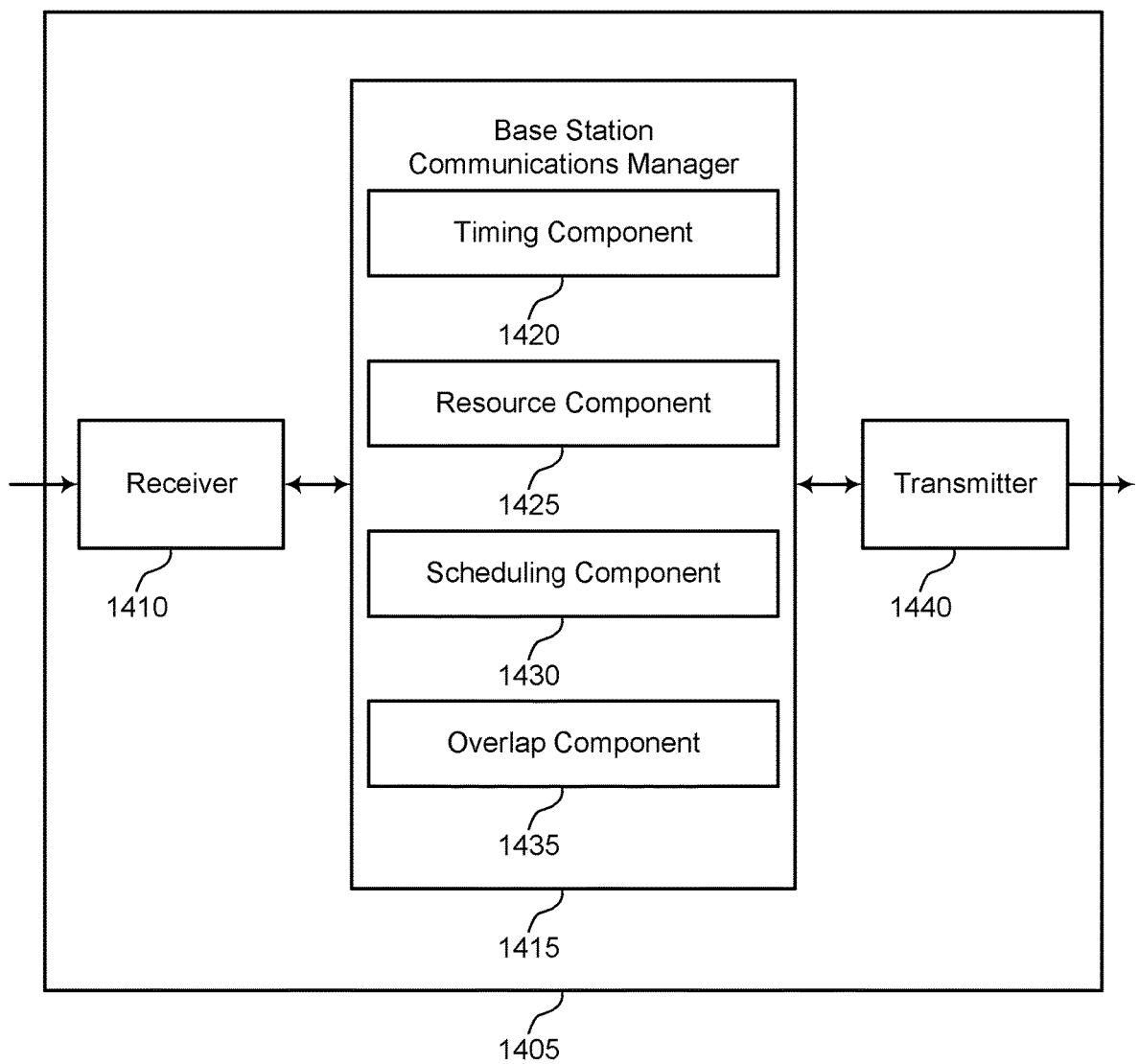

FIG. 14 shows a block diagram of a device 1405 that supports beam switching in a high radio frequency spectrum band in accordance with aspects of the present disclosure. The device 1405 may be an example of aspects of a device 1305, or a base station 105 as described with reference to one or more of FIG. 14, 13, or 1. The device 1405 may include a receiver 1410, a base station communications manager 1415, and a transmitter 1440. The base station communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to beam switching in a high radio frequency spectrum band, among other examples). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described with reference to FIG. 13. The base station communications manager 1415 may include a timing component 1420, a resource component 1425, a scheduling component 1430, and an overlap component 1435. The base station communications manager 1415 may be an example of aspects of the base station communications manager 1610 described with reference to FIG. 16.

The timing component 1420 may determine a duration for a UE to switch from one or more first directional beams to one or more second directional beams as part of a beam switch procedure. The resource component 1425 may allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels. The scheduling component 1430 may transmit scheduling information including an indication of the one or more symbols to the UE. The timing component 1420 may determine a duration for a UE to switch from one or more first directional beams to one or more second directional beams as part of a beam switch procedure. The resource component 1425 may allocate one or more symbols associated with one or more of one or more physical downlink channels or one or more physical uplink channels associated with one or more of the one or more first directional beams or the one or more second directional beams. The overlap component 1435 may determine, based on one or more of the duration or the allocation of the one or more symbols, an overlap of a symbol of the one or more symbols into the duration or a partial overlap of the symbol of the one or more symbols into the duration and communicate with the UE based on the determining. The methods performed by one or more of the timing component 1420, the resource component 1425, the scheduling component 1430, or the overlap component 1435 may support improvements to power consumption, reliability for beam switching, spectral efficiency, higher data rates and, in some examples, low latency for beam switching operations, among other benefits.

The transmitter 1440 may transmit signals generated by other components of the device 1405. In some examples, the transmitter 1440 may be collocated with a receiver 1410 in a transceiver component. For example, the transmitter 1440 may be an example of aspects of the transceiver 1620 described with reference to FIG. 16. The transmitter 1440 may utilize a single antenna or a set of antennas.

Figure 15:
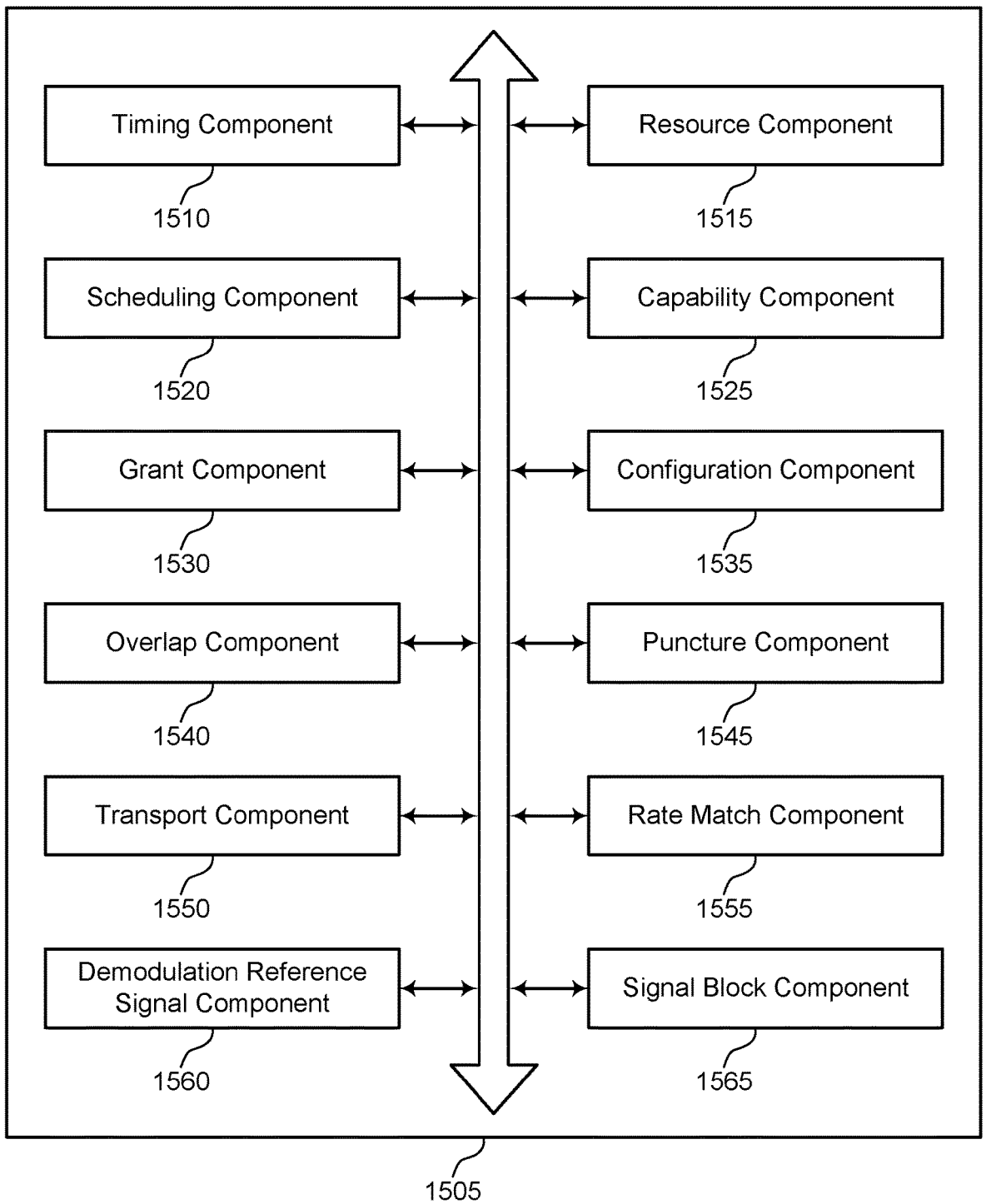
FIG. 15 shows a block diagram of a base station communications manager that supports beam switching in a high radio frequency spectrum band in accordance with aspects of the present disclosure.

FIG. 15 shows a block diagram of a base station communications manager 1505 that supports beam switching in a high radio frequency spectrum band in accordance with aspects of the present disclosure. The base station communications manager 1505 may be an example of aspects of a base station communications manager 1315, a base station communications manager 1415, or a base station communications manager 1610 described with reference to FIG. 16. The base station communications manager 1505 may include a timing component 1510, a resource component 1515, a scheduling component 1520, a capability component 1525, a grant component 1530, a configuration component 1535, an overlap component 1540, a puncture component 1545, a transport component 1550, a rate match component 1555, a demodulation reference signal component 1560, and a signal block component 1565. Each of these components may communicate, directly or indirectly, with one another (for example, via one or more buses).

The timing component 1510 may determine a duration for a UE to switch from one or more first directional beams to one or more second directional beams as part of a beam switch procedure. In some examples, the timing component 1510 may determine a duration for a UE to switch from one or more first directional beams to one or more second directional beams as part of a beam switch procedure. In some examples, the duration includes a default temporal value. In some examples, the duration to switch from the one or more first directional beams to the one or more second directional beams excludes time resources of one or more physical channels associated with one or more of the one or more first directional beams or the one or more second directional beams. In some examples, the duration to switch from the one or more first directional beams to the one or more second directional beams includes time resources of one or more physical channels associated with one or more of the one or more first directional beams or the one or more second directional beams.

The resource component 1515 may allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels. In some examples, the resource component 1515 may allocate one or more symbols associated with one or more of one or more physical downlink channels or one or more physical uplink channels associated with one or more of the one or more first directional beams or the one or more second directional beams. In some examples, the resource component 1515 may determine one or more of a symbol duration associated with the one or more symbols, a cyclic prefix duration associated with the one or more symbols, or a subcarrier spacing associated with the one or more symbols, in which allocating the one or more symbols between one or more of the two or more physical downlink channels or the two or more physical uplink channels is based on one or more of the symbol duration associated with the one or more symbols, the cyclic prefix duration associated with the one or more symbols, or the subcarrier spacing associated with the one or more symbols.

In some examples, the resource component 1515 may configure one or more of a control resource set or a secondary synchronization signal channel relating to one or more of the two or more physical downlink channels or the two or more physical uplink channels associated with one or more of the one or more first directional beams or the one or more second directional beams, in which allocating the one or more symbols between one or more of the two or more physical downlink channels or the two or more physical uplink channels is based on one or more of the control resource set or the secondary synchronization signal channel.

In some examples, the resource component 1515 may determine one or more of a subcarrier spacing associated with the one or more symbols, a symbol duration associated with the one or more symbols, or a cyclic prefix duration associated with the one or more symbols. In some examples, the resource component 1515 may configure a control resource set over one or more contiguous symbols or non-contiguous symbols of the one or more symbols for the switch from the one or more first directional beams to the one or more second directional beams. In some examples, the resource component 1515 may enable the UE to switch from the one or more first directional beams to the one or more second directional beams based on configuring the control resource set for two or more transmission configuration indication states. In some examples, one or more of the one or more first directional beams or the one or more second directional beams includes one or more downlink receive directional beams corresponding to the two or more physical downlink channels or one or more uplink transmit directional beams corresponding to the two or more physical uplink channels. In some examples, the two or more physical downlink channels includes one or more of a PDCCH or a PDSCH, and the two or more physical uplink channels includes one or more of a PUCCH or a PUSCH. In some examples, the one or more symbols correspond to one or more synchronization signal blocks having one or more synchronization signal block indices corresponding to one or more of the one or more first directional beams or the one or more second directional beams.

The scheduling component 1520 may transmit scheduling information including an indication of the one or more symbols to the UE. In some examples, the scheduling component 1520 may schedule one or more of the two or more physical downlink channels or the two or more physical uplink channels associated with one or more of the one or more first directional beams or the one or more second directional beams, in which allocating the one or more symbols between one or more of the two or more physical downlink channels or the two or more physical uplink channels is based on the scheduling. In some examples, the scheduling component 1520 may schedule a repetition of one or more of the two or more physical downlink channels or the two or more physical uplink channels associated with one or more of the one or more first directional beams or the one or more second directional beams, in which allocating the one or more symbols between one or more of the two or more physical downlink channels or the two or more physical uplink channels is based on the scheduled repetition. In some examples, the scheduling component 1520 may transmit downlink control information including an indication of the scheduled repetition of one or more of the two or more physical downlink channels or the two or more physical uplink channels associated with one or more of the one or more first directional beams or the one or more second directional beams.

In some examples, the scheduling component 1520 may activate a semi-persistent scheduling of one or more of the two or more physical downlink channels or the two or more physical uplink channels associated with one or more of the one or more first directional beams or the one or more second directional beams, in which allocating the one or more symbols between one or more of the two or more physical downlink channels or the two or more physical uplink channels is based on the semi-persistent scheduling. In some examples, the indication includes a time domain resource allocation field in the downlink control information. In some examples, the scheduled repetition includes a noncontiguous allocation of resources in a time domain between one or more of the two or more physical downlink channels or the two or more physical uplink channels associated with one or more of the one or more first directional beams or the one or more second directional beams, the time domain resource allocation field indicating the noncontiguous allocation in the time domain.

The overlap component 1540 may determine, based on one or more of the duration or the allocation of the one or more symbols, an overlap of a symbol of the one or more symbols into the duration or a partial overlap of the symbol of the one or more symbols into the duration. In some examples, the overlap component 1540 may communicate with the UE based on the determining. In some examples, the overlap component 1540 may determine the symbol of the one or more symbols is based at least in part a radio resource control configuration. In some examples, the overlap component 1540 may in which determining the overlap of the symbol of the one or more symbols into the duration or the partial overlap of the symbol of the one or more symbols into the duration is based on one or more of the subcarrier spacing, the symbol duration associated with the symbol of the one or more symbols, or the cyclic prefix duration associated with the symbol of the one or more symbols.

In some examples, the overlap component 1540 may determine that the partial overlap of the symbol of the one or more symbols into the duration is within an extended cyclic prefix duration. In some examples, the overlap component 1540 may apply the extended cyclic prefix duration to the symbol associated with the partial overlap into the duration, in which communicating with the UE is based on the applying. In some examples, the symbol is neighboring a beginning symbol of a physical channel associated with a directional beam of the one or more second directional beams that precedes a physical channel associated with a directional beam of the one or more first directional beams. In some examples, the symbol is neighboring an ending symbol of a physical channel associated with a directional beam of the one or more first directional beams that precedes a physical channel associated with a directional beam of the one or more second directional beams.

The capability component 1525 may receive UE capability information including an indication of the duration, in which determining the duration is based on the UE capability information. In some examples, the capability component 1525 may determine a capability of the UE associated with the beam switch procedure, in which allocating the one or more symbols between one or more of the two or more physical downlink channels or the two or more physical uplink channels is based on the capability of the UE.

The grant component 1530 may determine an uplink grant of one or more of the two or more physical downlink channels or the two or more physical uplink channels associated with one or more of the one or more first directional beams or the one or more second directional beams, in which allocating the one or more symbols between one or more of the two or more physical downlink channels or the two or more physical uplink channels is based on a type of the uplink grant. In some examples, the type of the uplink grant includes an uplink grant type one or an uplink grant type two.

The configuration component 1535 may configure a reference signal configuration relating to one or more of the two or more physical downlink channels or the two or more physical uplink channels associated with one or more of the one or more first directional beams or the one or more second directional beams, the reference signal configuration including a channel state information reference signal configuration or a sounding reference signal configuration, in which allocating the one or more symbols between one or more of the two or more physical downlink channels or the two or more physical uplink channels is based on the reference signal configuration.

The puncture component 1545 may puncture the symbol of the one or more symbols based on the determining, in which communicating with the UE is based on the puncturing. In some examples, the puncture component 1545 may determine a modulation coding scheme, in which puncturing the symbol of the one or more symbols is based on the modulation coding scheme. In some examples, puncture component 1545 may determine coded bits corresponding to the punctured symbol, in which communicating with the UE includes decoding a transmission from the base station using remaining coded bits and refraining from using the coded bits corresponding to the punctured symbol for the decoding.

The transport component 1550 may determine a transport block size based on the one or more symbols excluding the symbol of the one or more symbols associated with the overlap into the duration or the partial overlap into the duration, in which communicating with the UE is based on the transport block size. The rate match component 1555 may determine a rate matching operation for one or more of the one or more physical downlink channels or the one or more physical uplink channels associated with one or more of the one or more first directional beams or the one or more second directional beams, in which the rate matching operation includes rate matching around the symbol of the one or more symbols associated with the overlap into the duration or the partial overlap into the duration based on the determining, in which communicating with the UE is based on the rate matching operation.

In some examples, the rate match component 1555 may determine a modulation coding scheme, in which determining the rate matching operation is based on the modulation coding scheme. In some examples, determining a number of coded bits to transmit to the UE based on the one or more symbols excluding the symbol of the one or more symbols associated with the overlap into the duration or the partial overlap into the duration, in which communicating with the UE includes rate matching using remaining coded bits and refraining from using the coded bits corresponding to the punctured symbol for the rate matching.

The demodulation reference signal component 1560 may configure, based on the overlap of the symbol of the one or more symbols into the duration or the partial overlap of the symbol of the one or more symbols into the duration, a demodulation reference signal pattern associated with one or more of the one or more physical downlink channels or the one or more physical uplink channels associated with one or more of the one or more first directional beams or the one or ore second directional beams. In some examples, the demodulation reference signal component 1560 may shift a demodulation reference signal location to a second symbol of the one or more symbols that is non-overlapping with the duration. In some examples, the demodulation reference signal component 1560 may remove a demodulation reference signal location corresponding to an additional symbol of the one or more symbols associated with the overlap into the duration or the partial overlap into the duration, the demodulation reference signal location associated with one or more of the one or more physical downlink channels or the one or more physical uplink channels associated with one or more of the one or more first directional beams or the one or more second directional beams.

In some examples, the demodulation reference signal component 1560 may transmit an indication of the demodulation reference signal pattern via radio resource control signaling. In some examples, the demodulation reference signal component 1560 may transmit an indication of the demodulation reference signal pattern via MAC CE signaling. In some examples, the demodulation reference signal component 1560 may transmit an indication of the demodulation reference signal pattern via dynamic signaling. In some examples, the dynamic signaling includes downlink control information signaling. The signal block component 1565 may transmit one or more of a synchronization signal physical broadcast channel block over the symbol of the one or more symbols that has the partial overlap into the duration. The methods performed by one or more the timing component 1510, the resource component 1515, the scheduling component 1520, the capability component 1525, the grant component 1530, the configuration component 1535, the overlap component 1540, the puncture component 1545, the transport component 1550, the rate match component 1555, the demodulation reference signal component 1560, or the signal block component 1565 may support improvements to power consumption, reliability for beam switching, spectral efficiency, higher data rates and, in some examples, low latency for beam switching operations, among other benefits.

Figure 16:
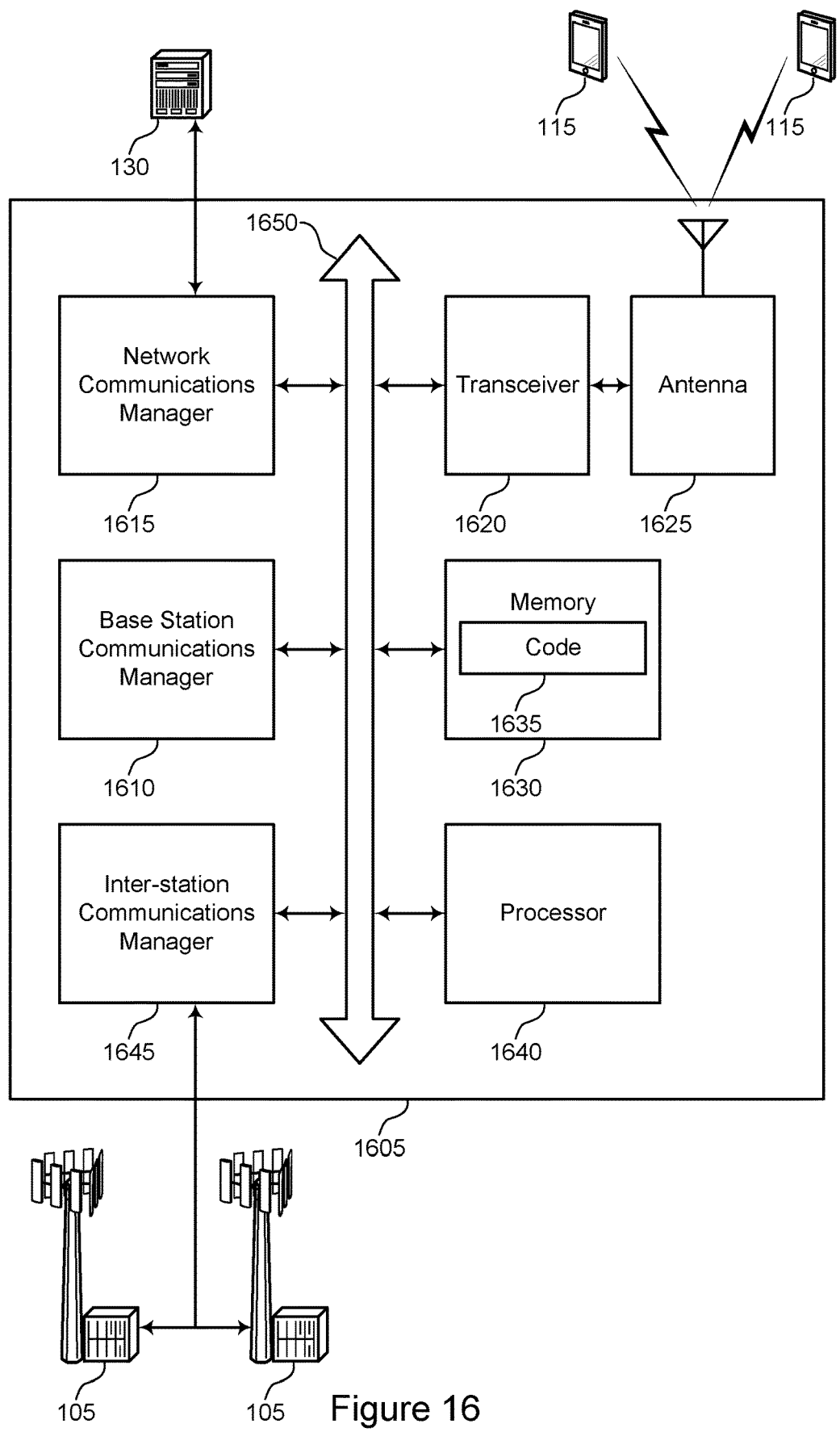
FIG. 16 shows a diagram of a system including a device that supports beam switching in a high radio frequency spectrum band in accordance with aspects of the present disclosure.

FIG. 16 shows a diagram of a system including a device 1605 that supports beam switching in a high radio frequency spectrum band in accordance with aspects of the present disclosure. The device 1605 may be an example of or include the components of device 1305, device 1405, or a base station 105 as described with reference to one or more of FIG. 13, 14, or 1. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. The base station communications manager 1610 can be implemented, at least in part, by one or both of a modem and the processor 1640. These components may be in electronic communication via one or more buses (for example, bus 1650).

The base station communications manager 1610 may determine a duration for a UE to switch from one or more first directional beams to one or more second directional beams as part of a beam switch procedure, allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels, and transmit scheduling information including an indication of the one or more symbols to the UE.

The base station communications manager 1610 may also determine a duration for a UE to switch from one or more first directional beams to one or more second directional beams as part of a beam switch procedure, allocate one or more symbols associated with one or more of one or more physical downlink channels or one or more physical uplink channels associated with one or more of the one or more first directional beams or the one or more second directional beams, determine, based on one or more of the duration or the allocation of the one or more symbols, an overlap of a symbol of the one or more symbols into the duration or a partial overlap of the symbol of the one or more symbols into the duration, and communicate with the UE based on the determining. The methods performed by base station communications manager 1610 may support improvements to power consumption, reliability for beam switching, spectral efficiency, higher data rates and, in some examples, low latency for beam switching operations, among other benefits.

The network communications manager 1615 may manage communications with the core network (for example, via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some examples, the device 1605 may include more than one antenna 1625, in which the device 1605 may be capable of concurrently transmitting or receiving multiple wireless transmissions.

The memory 1630 may include RAM, ROM, or a combination thereof. The memory 1630 may store computer-readable code 1635 including instructions that, when executed by a processor (for example, the processor 1640) cause the device to perform various functions described with reference to FIG. 16. In some examples, the memory 1630 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some examples, the code 1635 may not be directly executable by the processor 1640 but may cause a computer (for example, when compiled and executed) to perform functions described with reference to FIG. 16.

The processor 1640 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In some examples, a memory controller may be integrated into processor 1640. The processor 1640 may be configured to execute computer-readable instructions stored in a memory (for example, the memory 1630) to cause the device 1605 to perform various functions (for example, functions or tasks supporting beam switching in a high radio frequency spectrum band).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

Figure 17:
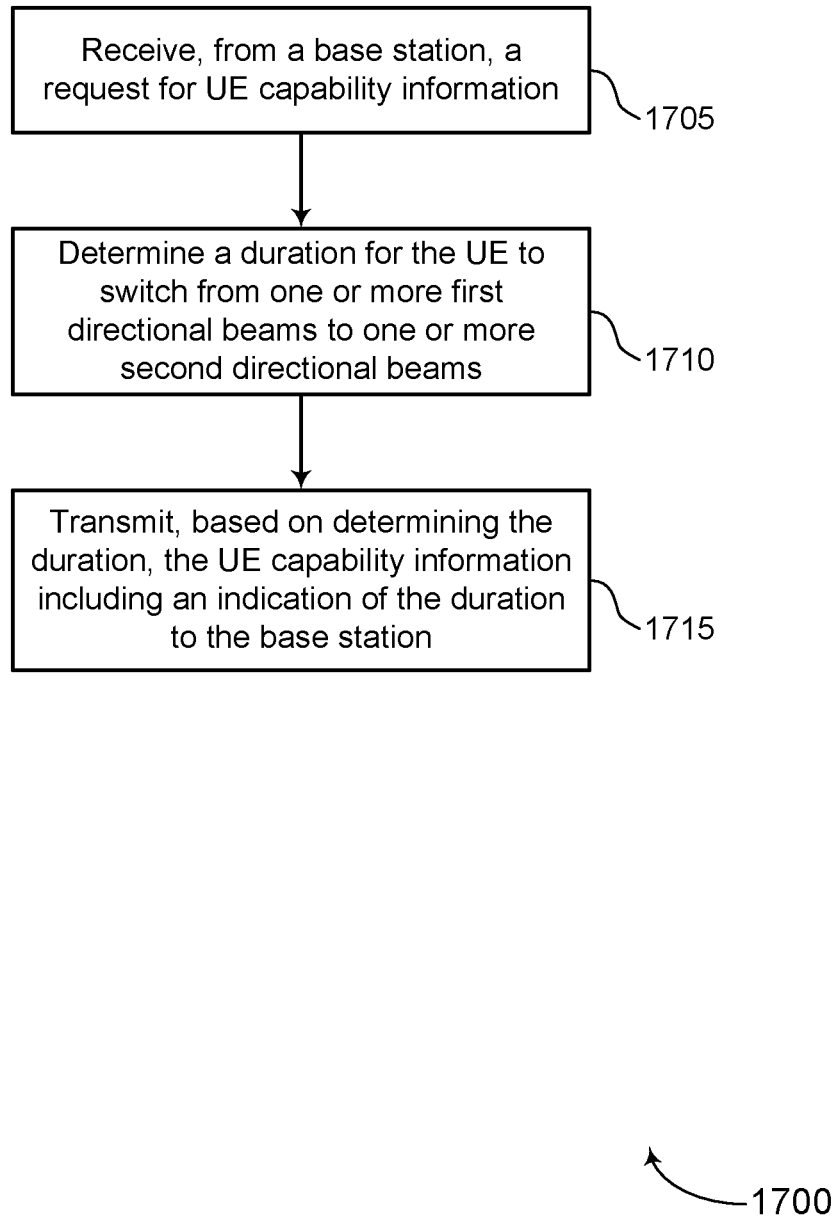
FIGS. 17-23 show flowcharts illustrating methods that support beam switching in a high radio frequency spectrum band in accordance with aspects of the present disclosure.

FIG. 17 shows a flowchart illustrating a method 1700 that supports beam switching in a high radio frequency spectrum band in accordance with aspects of the present disclosure. The operations of method 1700 may be implemented by a UE 115 or its components as described with reference to FIG. 1. For example, the operations of method 1700 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1705, the UE may receive, from a base station, a request for UE capability information. The operations of 1705 may be performed according to the methods described with reference to any of FIGS. 1-16. In some examples, aspects of the operations of 1705 may be performed by an inquiry component as described with reference to FIGS. 9-12.

At 1710, the UE may determine a duration for the UE to switch from one or more first directional beams to one or more second directional beams. The operations of 1710 may be performed according to the methods described with reference to any of FIGS. 1-16. In some examples, aspects of the operations of 1710 may be performed by a timing component as described with reference to FIGS. 9-12.

At 1715, the UE may transmit, based on determining the duration, the UE capability information including an indication of the duration to the base station. The operations of 1715 may be performed according to the methods described with reference to any of FIGS. 1-16. In some examples, aspects of the operations of 1715 may be performed by a capability component as described with reference to FIGS. 9-12.

Figure 18:
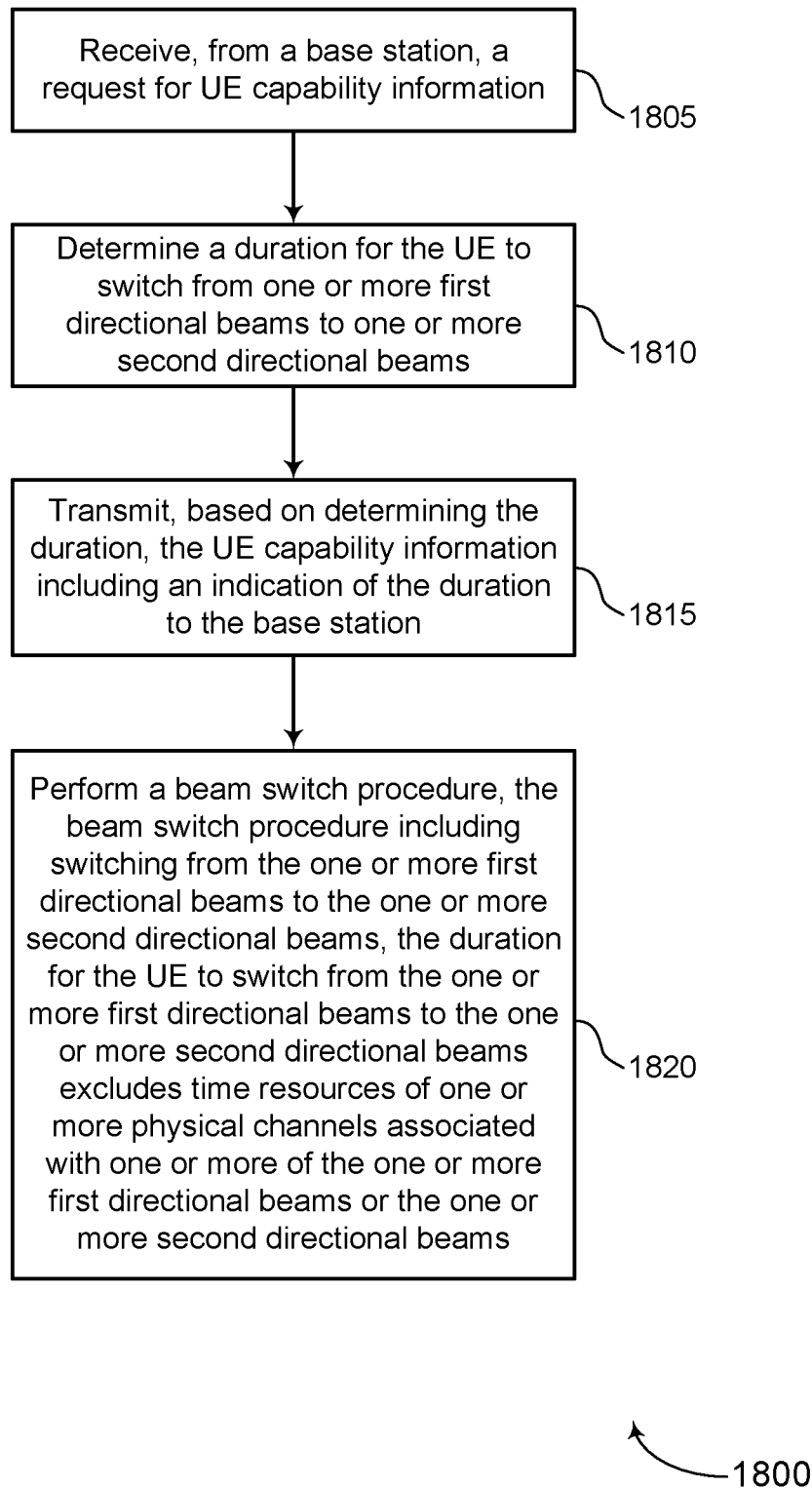

FIG. 18 shows a flowchart illustrating a method 1800 that supports beam switching in a high radio frequency spectrum band in accordance with aspects of the present disclosure. The operations of method 1800 may be implemented by a UE 115 or its components as described with reference to FIG. 1. For example, the operations of method 1800 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1805, the UE may receive, from a base station, a request for UE capability information. The operations of 1805 may be performed according to the methods described with reference to any of FIGS. 1-16. In some examples, aspects of the operations of 1805 may be performed by an inquiry component as described with reference to FIGS. 9-12.

At 1810, the UE may determine a duration for the UE to switch from one or more first directional beams to one or more second directional beams. The operations of 1810 may be performed according to the methods described with reference to any of FIGS. 1-16. In some examples, aspects of the operations of 1810 may be performed by a timing component as described with reference to FIGS. 9-12.

At 1815, the UE may transmit, based on determining the duration, the UE capability information including an indication of the duration to the base station. The operations of 1815 may be performed according to the methods described with reference to any of FIGS. 1-16. In some examples, aspects of the operations of 1815 may be performed by a capability component as described with reference to FIGS. 9-12.

At 1820, the UE may perform a beam switch procedure, the beam switch procedure including switching from the one or more first directional beams to the one or more second directional beams, the duration for the UE to switch from the one or more first directional beams to the one or more second directional beams excludes time resources of one or more physical channels associated with one or more of the one or more first directional beams or the one or more second directional beams. The operations of 1820 may be performed according to the methods described with reference to any of FIGS. 1-16. In some examples, aspects of the operations of 1820 may be performed by a beam switch component as described with reference to FIGS. 9-12.

Figure 19:
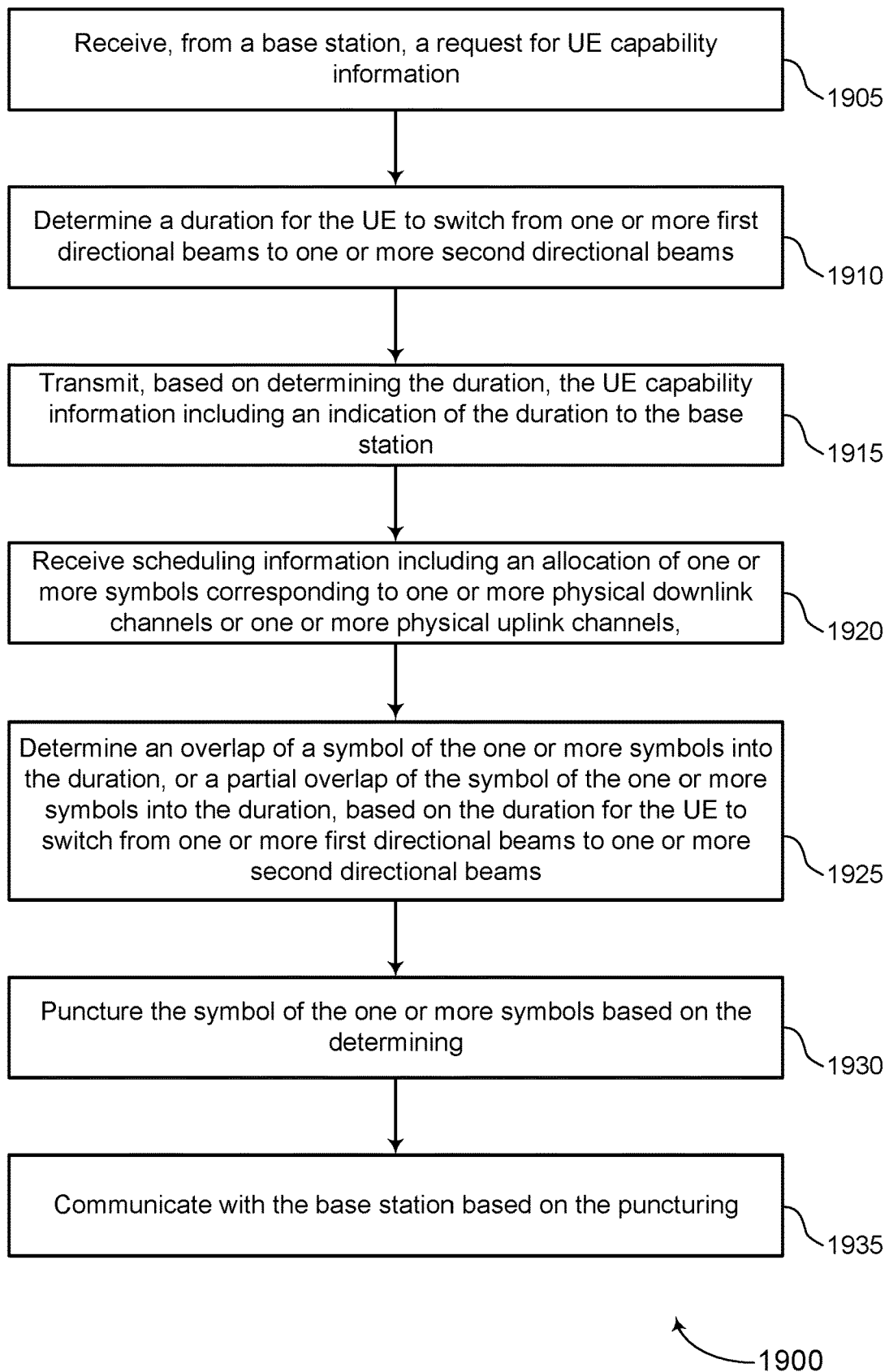

FIG. 19 shows a flowchart illustrating a method 1900 that supports beam switching in a high radio frequency spectrum band in accordance with aspects of the present disclosure. The operations of method 1900 may be implemented by a UE 115 or its components as described with reference to FIG. 1. For example, the operations of method 1900 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1905, the UE may receive, from a base station, a request for UE capability information. The operations of 1905 may be performed according to the methods described with reference to any of FIGS. 1-16. In some examples, aspects of the operations of 1905 may be performed by an inquiry component as described with reference to FIGS. 9-12.

At 1910, the UE may determine a duration for the UE to switch from one or more first directional beams to one or more second directional beams. The operations of 1910 may be performed according to the methods described with reference to any of FIGS. 1-16. In some examples, aspects of the operations of 1910 may be performed by a timing component as described with reference to FIGS. 9-12.

At 1915, the UE may transmit, based on determining the duration, the UE capability information including an indication of the duration to the base station. The operations of 1915 may be performed according to the methods described with reference to any of FIGS. 1-16. In some examples, aspects of the operations of 1915 may be performed by a capability component as described with reference to FIGS. 9-12.

At 1920, the UE may receive scheduling information including an allocation of one or more symbols corresponding to one or more physical downlink channels or one or more physical uplink channels. The operations of 1920 may be performed according to the methods described with reference to any of FIGS. 1-16. In some examples, aspects of the operations of 1920 may be performed by a scheduling component as described with reference to FIGS. 9-12.

At 1925, the UE may determine an overlap of a symbol of the one or more symbols into the duration, or a partial overlap of the symbol of the one or more symbols into the duration, based on the duration for the UE to switch from one or more first directional beams to one or more second directional beams. The operations of 1925 may be performed according to the methods described with reference to any of FIGS. 1-16. In some examples, aspects of the operations of 1925 may be performed by an overlap component as described with reference to FIGS. 9-12.

At 1930, the UE may puncture the symbol of the one or more symbols based on the determining. The operations of 1930 may be performed according to the methods described with reference to any of FIGS. 1-16. In some examples, aspects of the operations of 1930 may be performed by a puncture component as described with reference to FIGS. 9-12.

At 1935, the UE may communicate with the base station based on the puncturing. The operations of 1935 may be performed according to the methods described with reference to any of FIGS. 1-16. In some examples, aspects of the operations of 1935 may be performed by a puncture component as described with reference to FIGS. 9-12.

Figure 20:
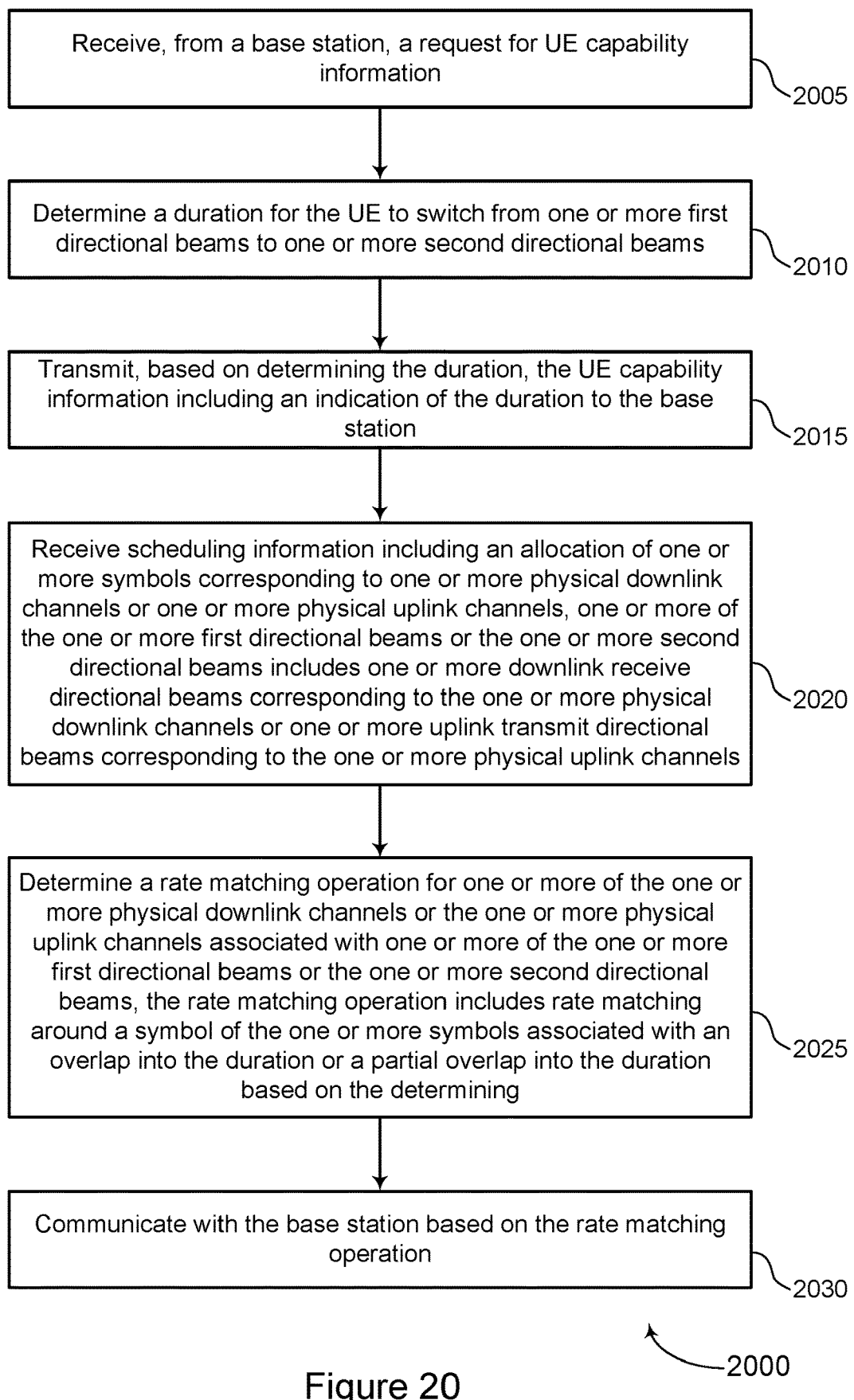

FIG. 20 shows a flowchart illustrating a method 2000 that supports beam switching in a high radio frequency spectrum band in accordance with aspects of the present disclosure. The operations of method 2000 may be implemented by a UE 115 or its components as described with reference to FIG. 1. For example, the operations of method 2000 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 2005, the UE may receive, from a base station, a request for UE capability information. The operations of 2005 may be performed according to the methods described with reference to any of FIGS. 1-16. In some examples, aspects of the operations of 2005 may be performed by an inquiry component as described with reference to FIGS. 9-12.

At 2010, the UE may determine a duration for the UE to switch from one or more first directional beams to one or more second directional beams. The operations of 2010 may be performed according to the methods described with reference to any of FIGS. 1-16. In some examples, aspects of the operations of 2010 may be performed by a timing component as described with reference to FIGS. 9-12.

At 2015, the UE may transmit, based on determining the duration, the UE capability information including an indication of the duration to the base station. The operations of 2015 may be performed according to the methods described with reference to any of FIGS. 1-16. In some examples, aspects of the operations of 2015 may be performed by a capability component as described with reference to FIGS. 9-12.

At 2020, the UE may receive scheduling information including an allocation of one or more symbols corresponding to one or more physical downlink channels or one or more physical uplink channels, one or more of the one or more first directional beams or the one or more second directional beams includes one or more downlink receive directional beams corresponding to the one or more physical downlink channels or one or more uplink transmit directional beams corresponding to the one or more physical uplink channels. The operations of 2020 may be performed according to the methods described with reference to any of FIGS. 1-16. In some examples, aspects of the operations of 2020 may be performed by a scheduling component as described with reference to FIGS. 9-12.

At 2025, the UE may determine a rate matching operation for one or more of the one or more physical downlink channels or the one or more physical uplink channels associated with one or more of the one or more first directional beams or the one or more second directional beams, the rate matching operation includes rate matching around a symbol of the one or more symbols associated with an overlap into the duration or a partial overlap into the duration based on the determining. The operations of 2025 may be performed according to the methods described with reference to any of FIGS. 1-16. In some examples, aspects of the operations of 2025 may be performed by a rate match component as described with reference to FIGS. 9-12.

At 2030, the UE may communicate with the base station based on the rate matching operation. The operations of 2030 may be performed according to the methods described with reference to any of FIGS. 1-16. In some examples, aspects of the operations of 2030 may be performed by a rate match component as described with reference to FIGS. 9-12.

Figure 21:
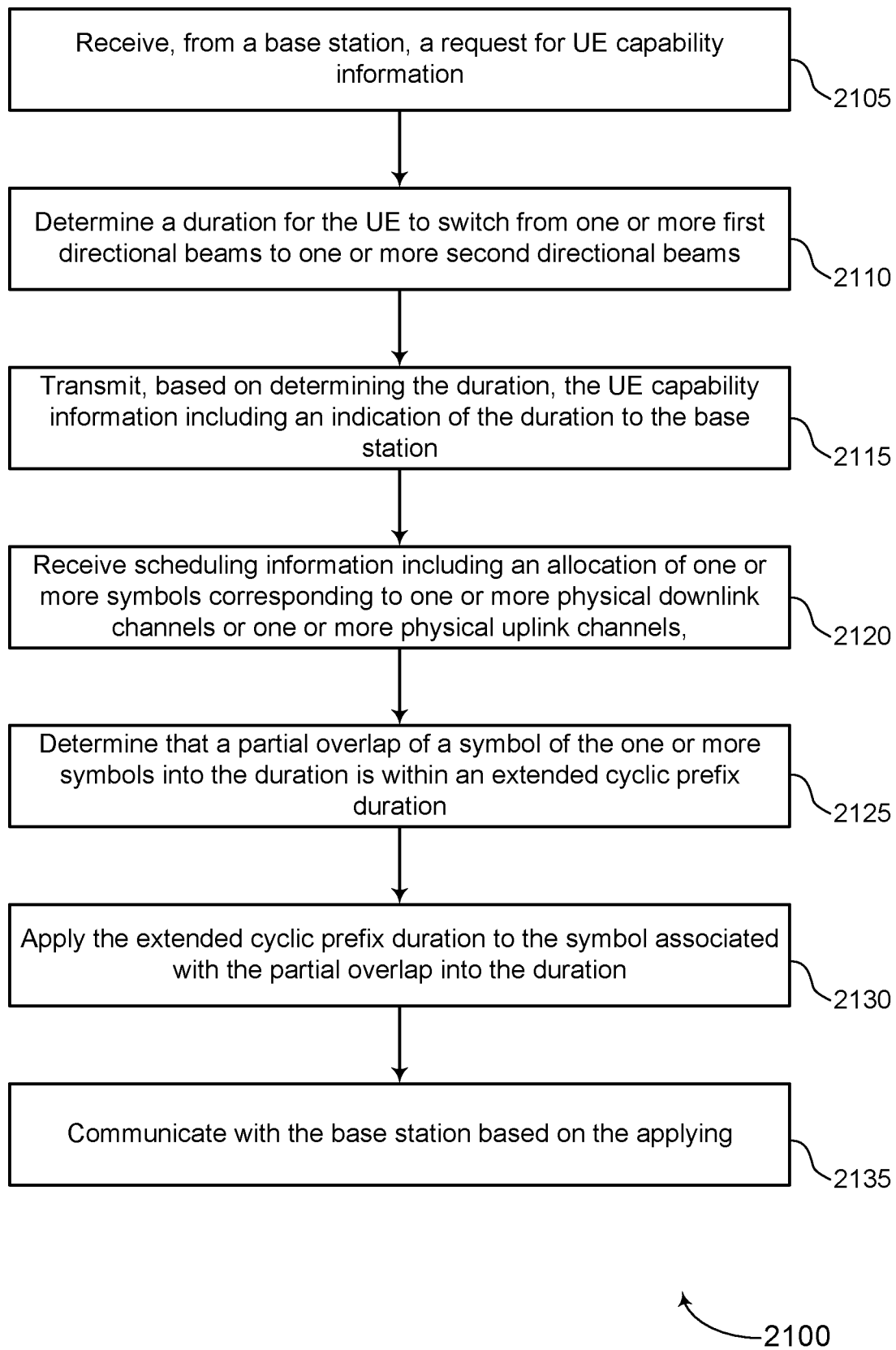

FIG. 21 shows a flowchart illustrating a method 2100 that supports beam switching in a high radio frequency spectrum band in accordance with aspects of the present disclosure. The operations of method 2100 may be implemented by a UE 115 or its components as described with reference to FIG. 1. For example, the operations of method 2100 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 2105, the UE may receive, from a base station, a request for UE capability information. The operations of 2105 may be performed according to the methods described with reference to any of FIGS. 1-16. In some examples, aspects of the operations of 2105 may be performed by an inquiry component as described with reference to FIGS. 9-12.

At 2110, the UE may determine a duration for the UE to switch from one or more first directional beams to one or more second directional beams. The operations of 2110 may be performed according to the methods described with reference to any of FIGS. 1-16. In some examples, aspects of the operations of 2110 may be performed by a timing component as described with reference to FIGS. 9-12.

At 2115, the UE may transmit, based on determining the duration, the UE capability information including an indication of the duration to the base station. The operations of 2115 may be performed according to the methods described with reference to any of FIGS. 1-16. In some examples, aspects of the operations of 2115 may be performed by a capability component as described with reference to FIGS. 9-12.

At 2120, the UE may receive scheduling information including an allocation of one or more symbols corresponding to one or more physical downlink channels or one or more physical uplink channels. The operations of 2120 may be performed according to the methods described with reference to any of FIGS. 1-16. In some examples, aspects of the operations of 2120 may be performed by a scheduling component as described with reference to FIGS. 9-12.

At 2125, the UE may determine that a partial overlap of a symbol of the one or more symbols into the duration is within an extended cyclic prefix duration. The operations of 2125 may be performed according to the methods described with reference to any of FIGS. 1-16. In some examples, aspects of the operations of 2125 may be performed by an overlap component as described with reference to FIGS. 9-12.

At 2130, the UE may apply the extended cyclic prefix duration to the symbol associated with the partial overlap into the duration. The operations of 2130 may be performed according to the methods described with reference to any of FIGS. 1-16. In some examples, aspects of the operations of 2130 may be performed by an overlap component as described with reference to FIGS. 9-12.

At 2135, the UE may communicate with the base station based on the applying. The operations of 2135 may be performed according to the methods described with reference to any of FIGS. 1-16. In some examples, aspects of the operations of 2135 may be performed by an overlap component as described with reference to FIGS. 9-12.

Figure 22:
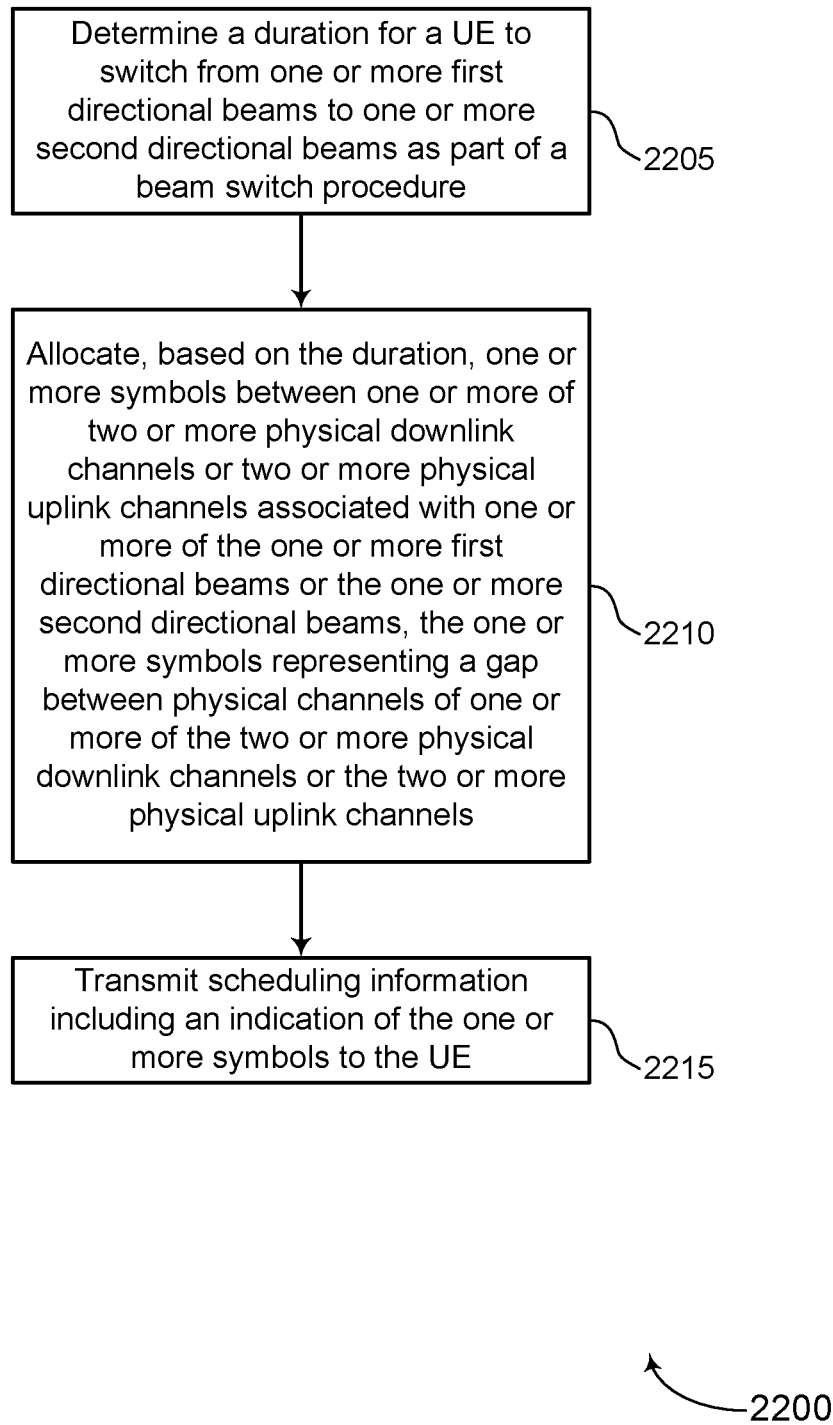

FIG. 22 shows a flowchart illustrating a method 2200 that supports beam switching in a high radio frequency spectrum band in accordance with aspects of the present disclosure. The operations of method 2200 may be implemented by a base station 105 or its components as described with reference to FIG. 1. For example, the operations of method 2200 may be performed by a communications manager as described with reference to FIGS. 13-16. In some examples, a base station may execute a set of instructions to control the functional elements of the base station to perform the functions described below. Additionally or alternatively, a base station may perform aspects of the functions described below using special-purpose hardware.

At 2205, the base station may determine a duration for a UE to switch from one or more first directional beams to one or more second directional beams as part of a beam switch procedure. The operations of 2205 may be performed according to the methods described with reference to any of FIGS. 1-16. In some examples, aspects of the operations of 2205 may be performed by a timing component as described with reference to FIGS. 13-16.

At 2210, the base station may allocate, based on the duration, one or more symbols between one or more of two or more physical downlink channels or two or more physical uplink channels associated with one or more of the one or more first directional beams or the one or more second directional beams, the one or more symbols representing a gap between physical channels of one or more of the two or more physical downlink channels or the two or more physical uplink channels. The operations of 2210 may be performed according to the methods described with reference to any of FIGS. 1-16. In some examples, aspects of the operations of 2210 may be performed by a resource component as described with reference to FIGS. 13-16.

At 2215, the base station may transmit scheduling information including an indication of the one or more symbols to the UE. The operations of 2215 may be performed according to the methods described with reference to any of FIGS. 1-16. In some examples, aspects of the operations of 2215 may be performed by a scheduling component as described with reference to FIGS. 13-16.

Figure 23:
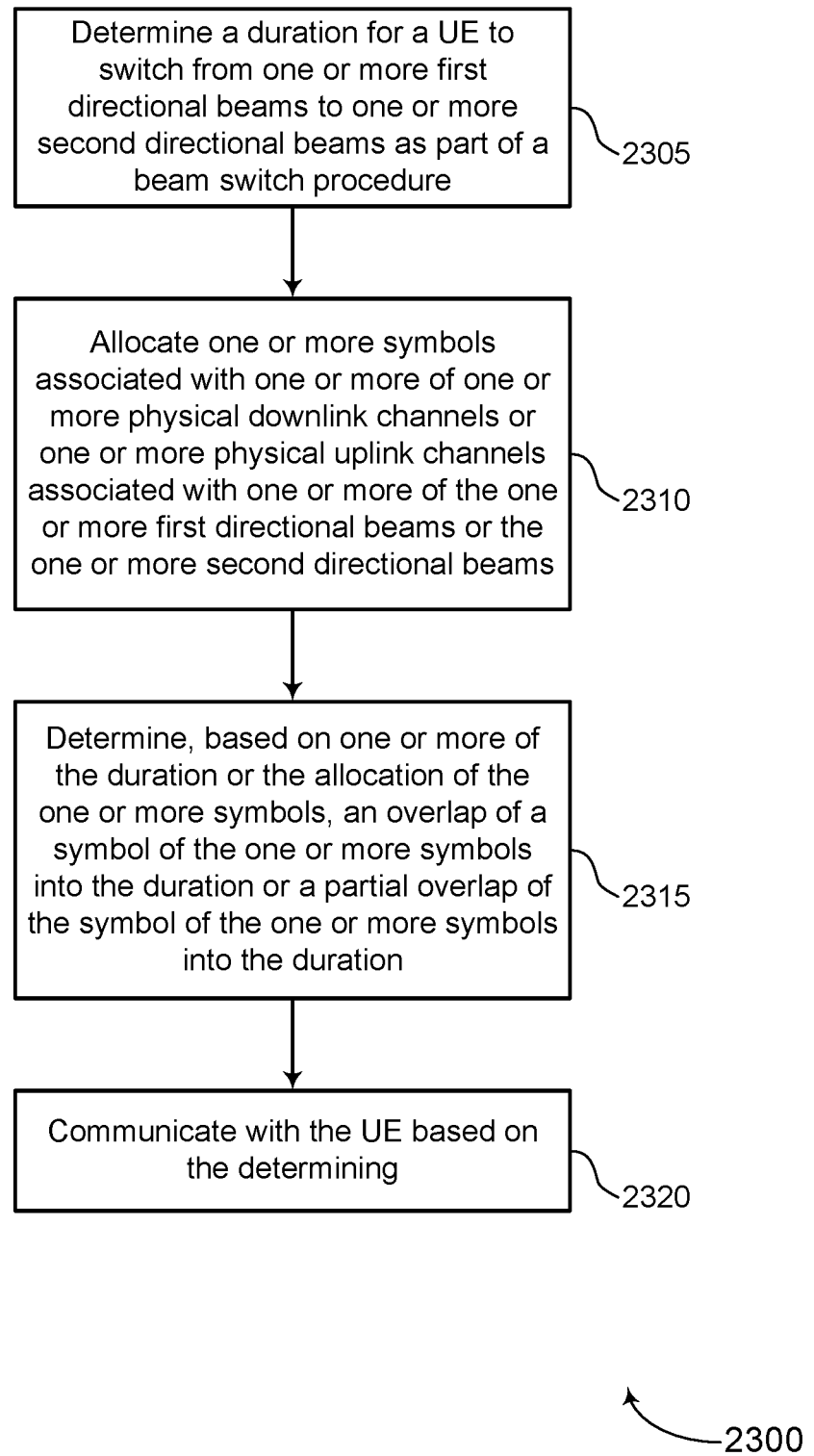

FIG. 23 shows a flowchart illustrating a method 2300 that supports beam switching in a high radio frequency spectrum band in accordance with aspects of the present disclosure. The operations of method 2300 may be implemented by a base station 105 or its components as described with reference to any of FIGS. 1-16. For example, the operations of method 2300 may be performed by a communications manager as described with reference to FIGS. 13-16. In some examples, a base station may execute a set of instructions to control the functional elements of the base station to perform the functions described below. Additionally or alternatively, a base station may perform aspects of the functions described below using special-purpose hardware.

At 2305, the base station may determine a duration for a UE to switch from one or more first directional beams to one or more second directional beams as part of a beam switch procedure. The operations of 2305 may be performed according to the methods described with reference to any of FIGS. 1-16. In some examples, aspects of the operations of 2305 may be performed by a timing component as described with reference to FIGS. 13-16.

At 2310, the base station may allocate one or more symbols associated with one or more of one or more physical downlink channels or one or more physical uplink channels associated with one or more of the one or more first directional beams or the one or more second directional beams. The operations of 2310 may be performed according to the methods described with reference to any of FIGS. 1-16. In some examples, aspects of the operations of 2310 may be performed by a resource component as described with reference to FIGS. 13-16.

At 2315, the base station may determine, based on one or more of the duration or the allocation of the one or more symbols, an overlap of a symbol of the one or more symbols into the duration or a partial overlap of the symbol of the one or more symbols into the duration. The operations of 2315 may be performed according to the methods described with reference to any of FIGS. 1-16. In some examples, aspects of the operations of 2315 may be performed by an overlap component as described with reference to FIGS. 13-16.

At 2320, the base station may communicate with the UE based on the determining. The operations of 2320 may be performed according to the methods described with reference to any of FIGS. 1-16. In some examples, aspects of the operations of 2320 may be performed by an overlap component as described with reference to FIGS. 13-16.

The methods described with reference to any of FIGS. 1-23 describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described with reference to any of FIGS. 1-23 are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described with reference to any of FIGS. 1-23 may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described with reference to any of FIGS. 1-23. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described with reference to any of FIGS. 1-23 may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described with reference to any of FIGS. 1-23 may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described with reference to any of FIGS. 1-23, but is to be accorded the broadest scope consistent with the principles and novel features disclosed herein.

What is claimed is:

1. A method for wireless communication at a user equipment (UE), comprising:
   receiving, from a network device, scheduling information comprising an allocation of one or more symbols corresponding to one or more physical downlink channels or one or more physical uplink channels;
   determining an overlap or a partial overlap of a symbol of the one or more symbols into a duration of a beam switch procedure during which the UE is to switch from one or more first directional beams to one or more second directional beams, one or more of the one or more first directional beams or the one or more second directional beams comprising one or more downlink receive directional beams corresponding to the one or more physical downlink channels or one or more uplink transmit directional beams corresponding to the one or more physical uplink channels; and communicating with the network device in the one or more symbols based at least in part on the determining.

2. The method of claim 1, further comprising:
receiving, from the network device, a request for UE capability information; and
determining the duration based at least in part on receiving the request.

3. The method of claim 1, further comprising:
receiving, from the network device, a radio resource control configuration message; and
determining the duration based at least in part on receiving the radio resource control configuration message.

4. The method of claim 1, wherein the symbol of the one or more symbols is preceding a beginning symbol of a physical channel associated with a directional beam of the one or more second directional beams that precedes a physical channel associated with a directional beam of the one or more first directional beams.

5. The method of claim 1, wherein the symbol of the one or more symbols is following an ending symbol of a physical channel associated with a directional beam of the one or more first directional beams that precedes a physical channel associated with a directional beam of the one or more second directional beams.

6. The method of claim 1, wherein the scheduling information is received via an radio resource control configuration.

7. The method of claim 1, wherein the scheduling information is received via downlink control information signaling.

8. The method of claim 1,
wherein determining the overlap of the symbol of the one or more symbols into the duration, or the partial overlap of the symbol of the one or more symbols into the duration, is based at least in part on one or more of a subcarrier spacing associated with the one or more symbols, a symbol duration associated with the symbol of the one or more symbols, or a cyclic prefix duration associated with the symbol of the one or more symbols.

9. The method of claim 1, wherein communicating with the network device based at least in part on the determining further comprises:
puncturing the symbol of the one or more symbols based at least in part on the overlap of the symbol of the one or more symbols into the duration or the partial overlap of the symbol of the one or more symbols into the duration, wherein the overlap or the partial overlap of the symbol into the duration is based at least in part on a length of the duration for the UE to switch from the one or more first directional beams to the one or more second directional beams, wherein communicating with the network device is based at least in part on the puncturing.

10. The method of claim 9, wherein puncturing the symbol of the one or more symbols is based at least in part on a modulation coding scheme.

11. The method of claim 9, further comprising determining coded bits of a plurality of coded bits corresponding to the punctured symbol, wherein communicating with the network device comprises decoding a transmission from the network device using remaining coded bits of the plurality of coded bits and refraining from using the coded bits corresponding to the punctured symbol for the decoding.

12. The method of claim 1, further comprising:
determining a transport block size based at least in part on the one or more symbols excluding the symbol of the one or more symbols associated with the overlap into the duration or the partial overlap into the duration; and
communicating with the network device based at least in part on the transport block size.

13. The method of claim 1, wherein communicating with the network device based at least in part on the determining further comprises:
rate matching around the symbol of the one or more symbols, wherein communicating with the network device is based at least in part on the rate matching.

14. The method of claim 13, wherein the rate matching is based at least in part on a modulation coding scheme.

15. The method of claim 13, further comprising determining a number of coded bits of a plurality of coded bits to transmit to the network device based at least in part on the one or more symbols excluding the symbol of the one or more symbols associated with the overlap into the duration or the partial overlap into the duration, wherein coded bits of the plurality of coded bits correspond to a punctured symbol for the rate matching, and the rate matching involves using remaining coded bits of the plurality of coded bits and refraining from using the coded bits corresponding to the punctured symbol for the rate matching.

16. The method of claim 1, wherein communicating with the network device based at least in part on the determining further comprises:
determining that the partial overlap of the symbol of the one or more symbols into the duration is within an extended cyclic prefix duration; and
applying the extended cyclic prefix duration to the symbol associated with the partial overlap into the duration, wherein communicating with the network device is based at least in part on the applying.

17. The method of claim 1, further comprising determining, based at least in part on the overlap of the symbol of the one or more symbols into the duration or the partial overlap of the symbol of the one or more symbols into the duration, a demodulation reference signal pattern associated with one or more of the one or more physical downlink channels or the one or more physical uplink channels.

18. The method of claim 17, further comprising determining a shift of a demodulation reference signal location to a second symbol of the one or more symbols that is non-overlapping with the duration.

19. The method of claim 17, further comprising determining a removal of an additional demodulation reference signal location corresponding to an additional symbol of the one or more symbols, the additional demodulation reference signal location associated with one or more of the one or more physical downlink channels or the one or more physical uplink channels.

20. The method of claim 1, further comprising receiving one or more of a synchronization signal physical broadcast channel block over the symbol of the one or more symbols that has the partial overlap into the duration, wherein the one or more symbols correspond to respective one or more synchronization signal blocks associated with one or more respective synchronization signal block indices corresponding to one or more of the one or more first directional beams or the one or more second directional beams.

21. The method of claim 1, wherein the beam switch procedure is based at least in part on a control resource set configuration over one or more symbols of the one or more symbols for the switch from the one or more first directional beams to the one or more second directional beams.

22. The method of claim 21, further comprising:
determining that the control resource set configuration supports two or more transmission configuration indication states; and
performing the beam switch procedure during the duration based at least in part on the determining.

23. The method of claim 1, wherein the one or more physical downlink channels comprises one or more of a physical downlink control channel (PDCCH), a physical downlink shared channel (PDSCH) or a synchronization signal physical broadcast channel (SS/PBCH) block, and the one or more physical uplink channels comprise one or more of a physical uplink control channel (PUCCH) or a physical uplink shared channel (PUSCH).

24. A method for wireless communication at a network device, comprising:
determining a duration for a user equipment (UE) to switch from one or more first directional beams to one or more second directional beams as part of a beam switch procedure;
allocating one or more symbols associated with one or more of one or more physical downlink channels or one or more physical uplink channels associated with one or more of the one or more first directional beams or the one or more second directional beams, one or more of the one or more first directional beams or the one or more second directional beams comprising one or more downlink receive directional beams corresponding to the one or more physical downlink channels or one or more uplink transmit directional beams corresponding to the one or more physical uplink channels;
determining, based at least in part on one or more of the duration or the allocation of the one or more symbols, an overlap of a symbol of the one or more symbols into the duration or a partial overlap of the symbol of the one or more symbols into the duration; and
communicating with the UE in the one or more symbols based at least in part on the determining.

25. The method of claim 24, wherein the duration to switch from the one or more first directional beams to the one or more second directional beams includes time resources of one or more physical channels associated with one or more of the one or more first directional beams or the one or more second directional beams.

26. The method of claim 24, wherein the symbol is preceding a beginning symbol of a physical channel associated with a directional beam of the one or more second directional beams that precedes a physical channel associated with a directional beam of the one or more first directional beams.

27. The method of claim 24, wherein the symbol is following an ending symbol of a physical channel associated with a directional beam of the one or more first directional beams that precedes a physical channel associated with a directional beam of the one or more second directional beams.

28. The method of claim 24, wherein the symbol of the one or more symbols is based at least in part on a radio resource control configuration.

29. The method of claim 24, wherein determining the overlap of the symbol of the one or more symbols into the duration or the partial overlap of the symbol of the one or more symbols into the duration is based at least in part on one or more of a subcarrier spacing associated with the one or more symbols, a symbol duration associated with the symbol of the one or more symbols, or a cyclic prefix duration associated with the symbol of the one or more symbols.

30. The method of claim 24, wherein communicating with the UE based at least in part on the determining further comprises:
puncturing the symbol of the one or more symbols based at least in part on the determining, wherein communicating with the UE is based at least in part on the puncturing.

31. The method of claim 30, wherein puncturing the symbol of the one or more symbols is based at least in part on a modulation coding scheme.

32. The method of claim 30, further comprising determining coded bits of a plurality of coded bits corresponding to the punctured symbol, wherein communicating with the UE comprises decoding a transmission from the UE using remaining coded bits of the plurality of coded bits and refraining from using the coded bits corresponding to the punctured symbol for the decoding.

33. The method of claim 24, further comprising determining a transport block size based at least in part on the one or more symbols excluding the symbol of the one or more symbols associated with the overlap into the duration or the partial overlap into the duration, wherein communicating with the UE is based at least in part on the transport block size.

34. The method of claim 24, wherein communicating with the UE based at least in part on the determining further comprises:
rate matching around the symbol of the one or more symbols associated with the overlap into the duration or the partial overlap into the duration based at least in part on the determining, wherein communicating with the UE is based at least in part on the rate matching.

35. The method of claim 34, wherein the rate matching is based at least in part on a modulation coding scheme.

36. The method of claim 34, further comprising determining a number of coded bits of a plurality of coded bits to transmit to the UE based at least in part on the one or more symbols excluding the symbol of the one or more symbols associated with the overlap into the duration or the partial overlap into the duration, wherein coded bits of the plurality of coded bits correspond to a punctured symbol for the rate matching, and the rate matching involves using remaining coded bits of the plurality of coded bits and refraining from using the coded bits corresponding to the punctured symbol for the rate matching.

37. The method of claim 24, wherein communicating with the UE based at least in part on the determining further comprises:
determining that the partial overlap of the symbol of the one or more symbols into the duration is within an extended cyclic prefix duration; and
applying the extended cyclic prefix duration to the symbol associated with the partial overlap into the duration, wherein communicating with the UE is based at least in part on the applying.

38. The method of claim 24, further comprising configuring, based at least in part on the overlap of the symbol of the one or more symbols into the duration or the partial overlap of the symbol of the one or more symbols into the duration, a demodulation reference signal pattern associated with one or more of the one or more physical downlink channels or the one or more physical uplink channels.

39. The method of claim 38, further comprising shifting a demodulation reference signal location to a second symbol of the one or more symbols that is non-overlapping with the duration.

40. The method of claim 38, further comprising removing a demodulation reference signal location corresponding to an additional symbol of the one or more symbols, the demodulation reference signal location associated with one or more of the one or more physical downlink channels or the one or more physical uplink channels.

41. The method of claim 38, further comprising transmitting an indication of the demodulation reference signal pattern via radio resource control signaling.

42. The method of claim 38, further comprising transmitting an indication of the demodulation reference signal pattern via medium access control (MAC) control element (CE) signaling.

43. The method of claim 38, further comprising transmitting an indication of the demodulation reference signal pattern via dynamic signaling.

44. The method of claim 43, wherein the dynamic signaling comprises downlink control information signaling.

45. The method of claim 24, wherein the one or more symbols correspond to one or more synchronization signal blocks having one or more synchronization signal block indices corresponding to one or more of the one or more first directional beams or the one or more second directional beams, the method further comprising:
transmitting one or more of a synchronization signal physical broadcast channel block over the symbol of the one or more symbols that has the partial overlap into the duration.

46. The method of claim 24, further comprising:
configuring a control resource set over one or more symbols of the one or more symbols for the switch from the one or more first directional beams to the one or more second directional beams; and
enabling the UE to switch from the one or more first directional beams to the one or more second directional beams based at least in part on configuring the control resource set for two or more transmission configuration indication states.

47. An apparatus for wireless communication, comprising:
a processor; and
memory coupled with the processor and storing instructions executable by the processor to cause the apparatus to:
receive, from a network device, scheduling information comprising an allocation of one or more symbols corresponding to one or more physical downlink channels or one or more physical uplink channels;
determine an overlap or a partial overlap of a symbol of the one or more symbols into a duration of a beam switch procedure during which the apparatus is to switch from one or more first directional beams to one or more second directional beams, one or more of the one or more first directional beams or the one or more second directional beams comprising one or more downlink receive directional beams corresponding to the one or more physical downlink channels or one or more uplink transmit directional beams corresponding to the one or more physical uplink channels; and
communicate with the network device in the one or more symbols based at least in part on the determining.

48. An apparatus for wireless communication, comprising:
a processor; and
memory coupled with the processor and storing instructions executable by the processor to cause the apparatus to:
determine a duration for a user equipment (UE) to switch from one or more first directional beams to one or more second directional beams as part of a beam switch procedure;
allocate one or more symbols associated with one or more of one or more physical downlink channels or one or more physical uplink channels associated with one or more of the one or more first directional beams or the one or more second directional beams, one or more of the one or more first directional beams or the one or more second directional beams comprising one or more downlink receive directional beams corresponding to the one or more physical downlink channels or one or more uplink transmit directional beams corresponding to the one or more physical uplink channels;
determine, based at least in part on one or more of the duration or the allocation of the one or more symbols, an overlap of a symbol of the one or more symbols into the duration or a partial overlap of the symbol of the one or more symbols into the duration; and
communicate with the UE in the one or more symbols based at least in part on the determining.

49. The apparatus of claim 48, wherein the duration to switch from the one or more first directional beams to the one or more second directional beams includes time resources of one or more physical channels associated with one or more of the one or more first directional beams or the one or more second directional beams.

* * * * *